US012560439B2

(12) United States Patent
Jung et al.

(10) Patent No.: US 12,560,439 B2
(45) Date of Patent: Feb. 24, 2026

(54) HIGH INTEGRITY PATH EXTRACTION IN RAIL USING AUTONOMY SENSORS

(71) Applicant: Hitachi Rail GTS Canada Inc., Toronto (CA)

(72) Inventors: Jaewook Jung, Toronto (CA); Veronica Marin, Toronto (CA); Mohamed Helwa, Toronto (CA); Jungwon Kang, Toronto (CA); David Beach, Toronto (CA)

(73) Assignee: Hitachi Rail GTS Canada Inc., Toronto (CA)

( * ) Notice: Subject to any disclaimer, the term of this patent is extended or adjusted under 35 U.S.C. 154(b) by 431 days.

(21) Appl. No.: 18/355,874

(22) Filed: Jul. 20, 2023

(65) Prior Publication Data

US 2024/0027196 A1 Jan. 25, 2024

Related U.S. Application Data

(60) Provisional application No. 63/368,910, filed on Jul. 20, 2022.

(51) Int. Cl.
G01C 21/28 (2006.01)

(52) U.S. Cl.
CPC ................................... G01C 21/28 (2013.01)

(58) Field of Classification Search
CPC ....... G01C 21/28; B61L 23/04; G06V 20/588; G06T 7/0004; G06T 2207/30108
USPC ............................................................. 702/5
See application file for complete search history.

(56) References Cited

U.S. PATENT DOCUMENTS

| | | | |
|---|---|---|---|
| 10,518,791 | B2 | 12/2019 | Singh |
| 10,549,768 | B2 | 2/2020 | Puttagunta et al. |
| 10,900,793 | B2 | 1/2021 | Jung et al. |
| 11,377,123 | B2 | 7/2022 | Mortazavi et al. |
| 2014/0203959 | A1 | 7/2014 | Kriel et al. |
| 2019/0039633 | A1 | 2/2019 | Li |

(Continued)

OTHER PUBLICATIONS

International Search Report and Written Opinion issued in corresponding International Application No. PCT/IB2023/057427, dated Oct. 25, 2023, Canadian Intellectual Property Office, Gatineau, Quebec, Canada.

*Primary Examiner* — John H Le
(74) *Attorney, Agent, or Firm* — Studebaker Brackett PLLC

(57) ABSTRACT

Path extraction for a vehicle on a guideway, the vehicle having two or more sensors. Two or more sensor inputs are received from two or more sensors including at least one active 3D sensor input from at least one active 3D sensor and at least one passive 2D sensor input from at least one passive 2D sensor. At least one active 3D sensor path is extracted based on the at least one active 3D sensor input and at least one passive 2D sensor path based on the at least one passive 2D sensor input. At least one 3D sensor ground surface model is generated based on the at least one passive 2D sensor path. At least one passive 3D path is generated based on the at least one passive 2D sensor path and the at least one 3D sensor ground surface model. The at least one passive 3D path and the at least one active 3D sensor path are fused to produce a consolidated 3D path. In a path extraction pipeline, at least one supervision check is performed for providing integrity to the consolidated 3D path.

20 Claims, 9 Drawing Sheets

(56)　　　　　　References Cited

U.S. PATENT DOCUMENTS

| 2019/0353774 | A1 | 11/2019 | Chondro et al. | |
| 2020/0070859 | A1 | 3/2020 | Green et al. | |
| 2020/0174112 | A1 | 6/2020 | Xing et al. | |
| 2021/0072743 | A1 | 3/2021 | Otaki et al. | |
| 2021/0089055 | A1* | 3/2021 | Tran ..................... | G06N 3/0495 |
| 2021/0094595 | A1 | 4/2021 | Kälberer et al. | |
| 2021/0114637 | A1 | 4/2021 | Chung et al. | |
| 2021/0302564 | A1 | 9/2021 | Lee | |
| 2021/0362759 | A1 | 11/2021 | Khosla | |
| 2022/0114752 | A1 | 4/2022 | Kavulya et al. | |
| 2022/0161815 | A1 | 5/2022 | Van Beek et al. | |

* cited by examiner

310

314

312

352

Width

350

Length

Track Window

320

322

360

A Pair of Track Windows

340

342

330 — Track Region With Curvature Constraint

300

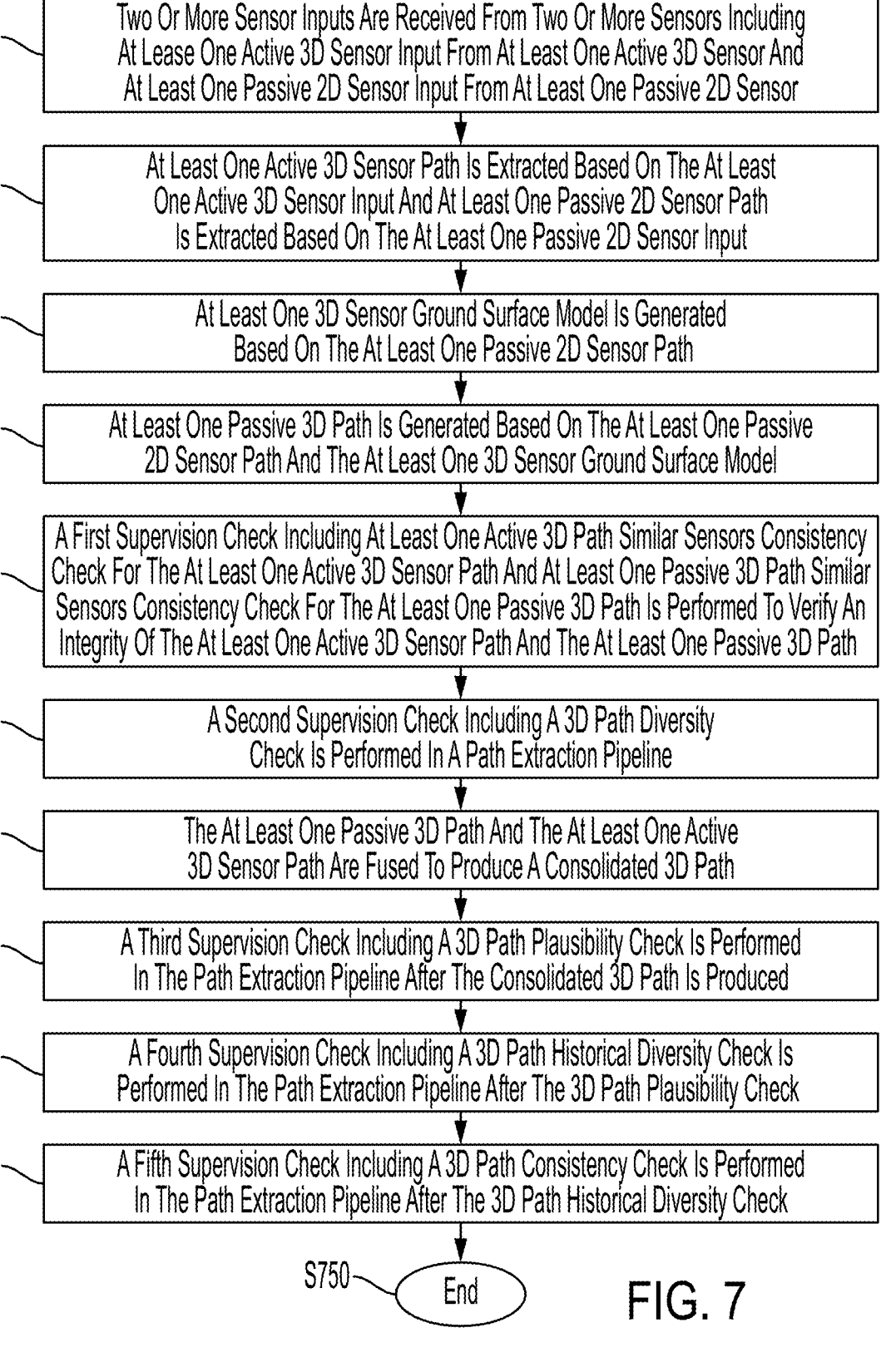

700

S702 — Start

S710 — Two Or More Sensor Inputs Are Received From Two Or More Sensors Including At Lease One Active 3D Sensor Input From At Least One Active 3D Sensor And At Least One Passive 2D Sensor Input From At Least One Passive 2D Sensor S714 — At Least One Active 3D Sensor Path Is Extracted Based On The At Least One Active 3D Sensor Input And At Least One Passive 2D Sensor Path Is Extracted Based On The At Least One Passive 2D Sensor Input S718 — At Least One 3D Sensor Ground Surface Model Is Generated Based On The At Least One Passive 2D Sensor Path S722 — At Least One Passive 3D Path Is Generated Based On The At Least One Passive 2D Sensor Path And The At Least One 3D Sensor Ground Surface Model S726 — A First Supervision Check Including At Least One Active 3D Path Similar Sensors Consistency Check For The At Least One Active 3D Sensor Path And At Least One Passive 3D Path Similar Sensors Consistency Check For The At Least One Passive 3D Path Is Performed To Verify An Integrity Of The At Least One Active 3D Sensor Path And The At Least One Passive 3D Path S730 — A Second Supervision Check Including A 3D Path Diversity Check Is Performed In A Path Extraction Pipeline S734 — The At Least One Passive 3D Path And The At Least One Active 3D Sensor Path Are Fused To Produce A Consolidated 3D Path S738 — A Third Supervision Check Including A 3D Path Plausibility Check Is Performed In The Path Extraction Pipeline After The Consolidated 3D Path Is Produced S742 — A Fourth Supervision Check Including A 3D Path Historical Diversity Check Is Performed In The Path Extraction Pipeline After The 3D Path Plausibility Check S746 — A Fifth Supervision Check Including A 3D Path Consistency Check Is Performed In The Path Extraction Pipeline After The 3D Path Historical Diversity Check S750 — End

FIG. 7

HIGH INTEGRITY PATH EXTRACTION IN RAIL USING AUTONOMY SENSORS

PRIORITY CLAIM

The present application claims the priority of U.S. Provisional Application No. 63/368,910 filed Jul. 20, 2022, which is incorporated herein by reference in its entirety.

BACKGROUND

Path/track extraction in the rail industry is performed by either (a) offline survey-grade data gathering, or (b) online onboard data processing.

Offline survey-grade data processing uses surveying devices such as Total Station (SBB software), EM-SAT, high-density LiDAR surveys (with the aid of ground control points (GCP), Global Navigation Satellite System (GNSS), and/or Inertial Measurement Units/IMUs, and GNSS/IMU surveys. Survey techniques are; however, expensive because survey techniques rely on special devices, manual operations, and extensive post-processing. The offline constructed paths using survey methods can be used if the position of the train is accurately known, which is not the case in the scenario of safe recovery of trains that have lost position. In addition, when train position is known with a given position uncertainty, the accuracy of the paths can significantly vary in switch regions. Hence, online extraction of the corresponding track path (also referred to as an ego-path) of the train of interest is used, i.e., the corresponding track for the autonomous train of interest, and this is performed using the set of autonomy sensors onboard the train which are much cheaper but less dense and less accurate than survey devices.

Other path extraction techniques based on online onboard data processing rely on data that may not be available in real operation (e.g., backreflection from the rail head/top-of-rail), do not make use of highly constraining rail information, and/or do not adequately combine multiple sensors to manage performance and integrity.

BRIEF DESCRIPTION OF THE DRAWINGS

Embodiments are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 is a flowchart of a method for performing path extraction for a vehicle on a guideway according to at least one embodiment.

DETAILED DESCRIPTION

Figure 1:
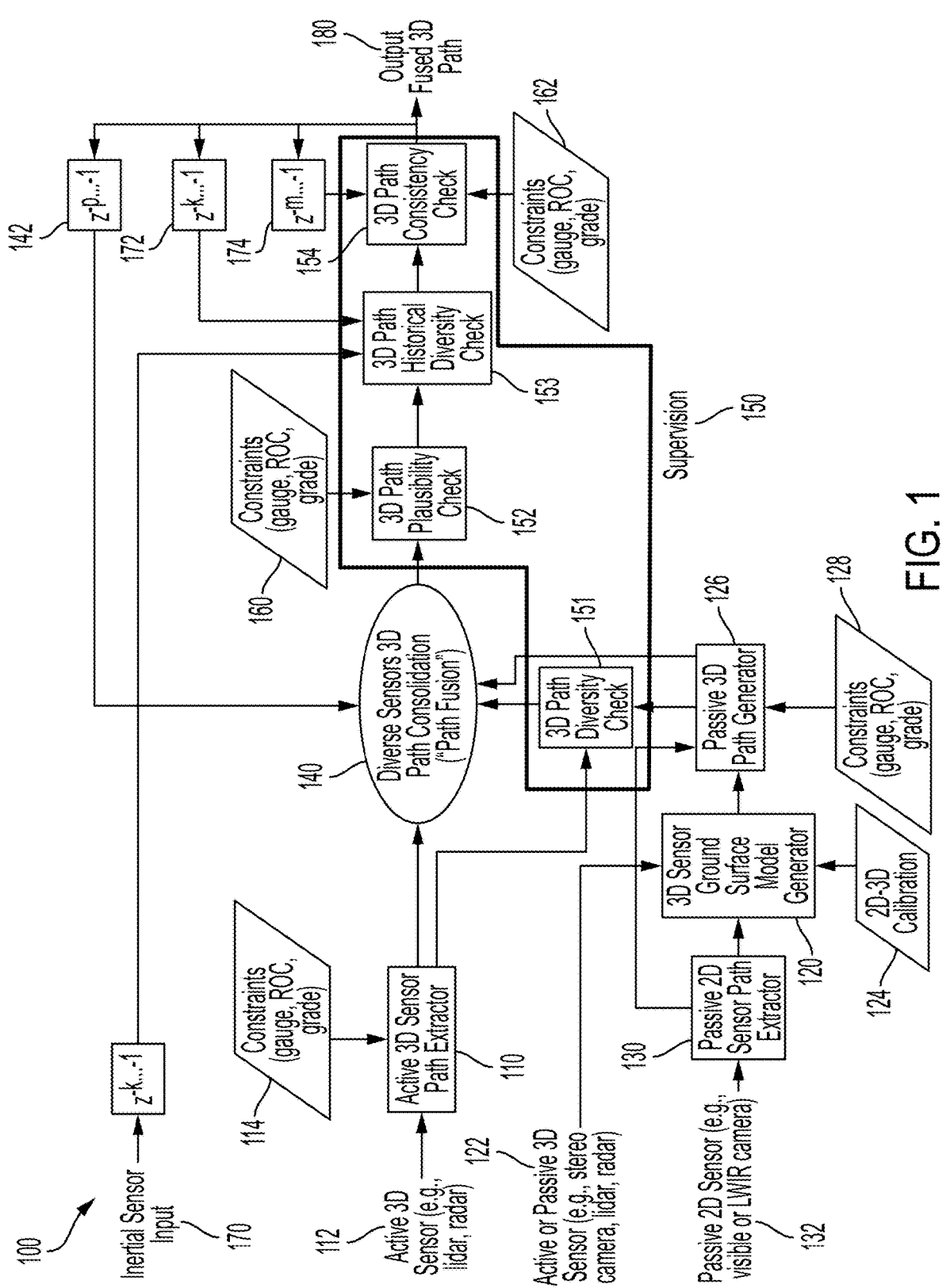
FIG. 1 is a block diagram of an Overall Path Extraction Architecture for CMPE according to at least one embodiment.

Embodiments described herein provide many different examples for implementing different features of the provided subject matter. Specific examples of components, values, operations, materials, arrangements, or the like, are described below to simplify the embodiments described herein. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, descriptions of embodiments herein repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A safety-critical application is an application whose failure or malfunction may result in death or serious injury to people, loss or severe damage to equipment/property or environmental harm. A safety-critical application or system is rated Safety Integrity Level (SIL) 4. For a system to be rated as Safety Integrity Level (SIL) 4, the system provides demonstrable on-demand reliability, and techniques and measurements to detect and react to failures that may compromise the system's safety properties. SIL 4 is based on International Electrotechnical Commission's (IEC) standard IEC 61508 and EN standards 50126 and 50129. For a SIL 4 system, the probability of failure per hour ranges from $10^{-8}$ to $10^{-9}$. Safety systems that do not meet a safety integrity level standard are referred to as non SIL. Embodiments described herein are implemented according to Safety Integrity Level (SIL) 4.

The technical domain of one or more embodiments includes path/track extraction in the rail industry, and one or more of the technical problems is to construct candidate paths for train motion using mobile autonomy sensors onboard the train; i.e., without assuming any information from the positioning system or from the reference map/infrastructure database. The candidate paths are constructed with high integrity to be used in safety-critical navigation solutions. The mobile autonomy sensors are installed onboard the train and include a set of commercial-of-the-shelf (COTS) sensors, where a sensor is referred to herein as either a Passive 2D Sensor (e.g., Image-Frame-Based Sensors, such as cameras), an Active 3D Point-Cloud Sensor (e.g., LiDAR or Radar), or a Passive 3D Point-Cloud Sensor (e.g., stereo camera pair). In at least one embodiment, the methods describe combination of Passive 2D, and Active and Passive 3D Sensor outputs (thusly defined) to achieve rail path extraction. Thus, the sensors may include one or more mobile LiDARs (3D Sensors) with camera (visible color or monochrome and/or infrared; 2D Sensors), Radar/ Imaging Radar (3D Sensors) and/or Inertial Measurement Units (IMUs). Embodiments described herein include methods and architectures to (a) extract path information from 2D and 3D Sensors, and (b) combine path information from 2D and 3D Sensors to achieve performance and integrity.

At least one embodiment combines data of multiple, on-board autonomy sensors (e.g., one or more mobile LiDARs, cameras, Radars, and/or IMUs) to extract online candidate train paths of the train with high confidence and integrity. At least one embodiment leverages sensor diversity via the use of complementary passive 2D and active 3D sensing (Complementary Multi-Sensor Path Extraction (CMPE)), and is flexible to accommodate multiple types of particular sensing technology (Redundant Multi-Sensor Path Extraction (RMPE)); e.g., multiple Passive 2D Sensors (e.g., visible and LWIR camera, or two visible cameras) and/or multiple Active 3D Sensors (e.g., LiDAR and Imaging Radar).

In at least one embodiment, CMPE includes fused single-sensor pipelines for path/track extraction: a Passive 2D Sensor (e.g., camera) pipeline is fused with an Active 3D Sensor (e.g., LiDAR) pipeline, and (optionally) IMU data can be used to crosscheck the past path against vehicle inertial data. Diversity check and consecutive sensor fusion between the outcome of the single-sensor pipelines are carried out for detecting potential errors due to the limitations of the individual sensor technologies, and hence, to ensure high integrity of the outcome of the overall path extraction function. Optionally in at least one embodiment, the IMU data, stored over a sliding time window/buffer, is used to crosscheck the curvature and slope information of the current ego-path of the train. This improves the integrity of path extraction as described in embodiments herein as the IMU sensor is not affected by the scene as are the camera, LiDAR and Radar Sensors. RMPE combines multiple CMPE chains with similar sensors consistency checking to increase integrity and performance.

At least one embodiment described herein uses inexpensive COTS autonomy sensors, and does not involve knowing the position of the train. Hence, at least one embodiment described herein is able to be used for the cases when the train position is not available (recovery of train with lost position scenario) or not sufficiently accurate.

At least one embodiment includes methods and architectures for CMPE and RMPE, including:

1) Passive 2D Sensor Path Extraction—Independent extraction of path using Passive 2D Sensor data (CMPE and RMPE).

2) Active 3D Sensor Path Extraction—Independent extraction of path using Active 3D Sensor data (CMPE and RMPE).

3) Path Fusion—Combining and consolidating 2D path information with 3D path information (CMPE and RMPE).

4) Similar Sensors Consolidation—Combining multiple 2D paths togethers, or multiple 3D paths together (RMPE).

5) Supervision and cross-checking, including one or more of:
   a) 3D Path Diversity Check (CMPE and RMPE);
   b) 3D Path Plausibility Check (CMPE and RMPE);

c) 3D Path Historical Diversity Check (CMPE and RMPE);
   d) 3D Path Consistency Check (CMPE and RMPE); and
   e) 3D Path Similar Sensors Consistency Check (RMPE).

At least one embodiment is in the domain of path/rail/ track/spline/guideway extraction or generation in the rail industry. At least one feature of the at least one embodiment is using COTS autonomy sensors onboard the train (e.g., mobile LiDARs, cameras, Radars and IMUs), not survey sensors, for generating the candidate track ego-paths of train online and without the need for knowing the position of the train in the rail network.

Path extraction is a functionality used for autonomous trains. The path information is used as a basis for various vehicle situational awareness functions such as (1) forward object detection that detects obstacles along an ego-path hindering the safe train operation, (2) signal recognition that detects ego signal (i.e., signal corresponding to train of interest) based on ego-path information and recognizes the vehicle aspect, and (3) positioning that localizes the vehicle by understanding the surrounding environment of the vehicle including path information. Thus, accurate and complete path information is used to support successive functions for autonomous driving.

In other path extraction methods, paths are created through offline processing where semi-automatic or manual methods are applied to data collected from various surveying methods such as LiDAR, total stations, and GNSS/IMU to extract the path. During train operation, the extracted paths are retrieved with the aid of a known vehicle position. However, other path extraction methods include at least one or more of the following problems:

Accurate position of the train is used to retrieve appropriate path information, which makes these approaches not suitable for the case of lost train position (safe recovery of trains with lost position use case), or the case of train position with a large uncertainty;

Expensive offline surveys use special devices and additional surveying process; or For data gathered with offline surveys, offline semi-automatic or manual effort is used to handle a large size of survey data and to extract paths from the survey data.

Online path extraction methods that use onboard train autonomy sensors also have problems. Several other methods have been reported on online path extraction that detects paths using data obtained from sensors mounted on the train. However, other path extraction based on online path extraction focuses on specific sensor data (e.g., camera-based or LiDAR-based) and has one or more of the following problems:

Output/quality of the extracted paths depends on the characteristics of the sensor used.

Other camera-based path extractions extract 2D paths which cannot be directly used for autonomous driving applications.

Other LiDAR-based path extraction uses points corrected from tracks as evidence of track to extract or recognize paths. A specific installation of LiDAR is used to collect track points (e.g., LiDAR sensor is mounted facing the ground).

No other path extraction technique exists that improves the accuracy and completeness of paths extracted from one specific sensor.

In accordance with at least one embodiment, an online path extraction method uses multiple sensors that improves accuracy and completeness of extracted paths by integrating or fusing paths derived from different sensors. Also, the online path extraction method is generic enough to support the use of COTS autonomy sensors which may have constraints on their installation to meet the needs for other autonomy services.

Other path extraction methods exhibit one or more of the following problems:

Low robustness due to the reliance on a single sensor modality: For example, LiDAR data is used to extract paths. Camera images are used in the visible or invisible spectra. However, heavy reliance on a single sensor can bring an issue of low robustness.

Restricted to a specific type of LiDAR and characteristics: For example, a LiDAR-based path extraction method is restricted to a specific type of LiDAR with a particular point cloud pattern (e.g., spinning LiDAR with high density points). This makes the method less applicable to COTS mobile LiDARs especially those with low density. Furthermore, the LiDAR sensor is used in more than one service, e.g., for path extraction and for detecting gantry or poles in signal aspect recognition services. The installation of LiDAR is to be almost parallel to the ground to be able to detect poles/gantries at further distances. But this in turn increases the incident angle of rail points, and thus, methods that rely on detecting a particular pattern of rail points will not work properly.

Focusing on the generation of a segmentation mask for a path, not a polynomial trajectory: To handle safety-critical navigation cases, it is critical that a path is represented as a polynomial trajectory so that the polynomial can be used to predict a path which exists beyond a detectable distance. However, other path extraction methods that are camera-based have focused on generating a path region, which is a segmentation mask. The segmentation mask indicates pixels for a path in the input image. However, such mask does not include any information about the polynomial trajectory for a path. In other path extraction methods, additional heavy processing is used to obtain the polynomial trajectory from the segmentation mask.

Vulnerable to errors in rail segmentation results: For example, camera-based path extraction methods, heavily rely on the utilization of rail segmentation results to generate the final result, i.e., path region mask. The quality of rail segmentation results highly affects the final results. However, rail segmentation is prone to include errors, especially for faraway rails, as the faraway rail is shown with a few pixels in an image. Thus, performance degradation is expected even if small errors in rail segmentation exist.

Heavily relying on a priori information about scene geometry: To extract a path, camera-based path extraction work heavily relies on a priori information about scene geometry, such as the relative position between camera and rail tracks, and locations of rail tracks. However, even a slight deviation between a priori information and the real position incurs performance degradation. Thus, the methods heavily relying on a priori information work in limited cases.

DESCRIPTION OF EMBODIMENTS

Accordingly, at least one embodiment includes an online path extraction system using multiple sensors.

At least one embodiment combines two or more of the following elements:

High-integrity, high-accurate path extraction method that improves accuracy and completeness of extracted paths by combining paths derived from multiple sensors which have their own characteristics.

State-of-the-art machine-learning detector (path extraction network combined with semantic segment network), trained with a comprehensive dataset based on sensor data obtained under different weather conditions.

Fully automated Kalman Filter-based LiDAR path detector that extracts rail path without installation constraints for LiDAR sensor by using an empty region for rail track and track points as observations for rail tracking.

Accurate ground surface model generated from LiDAR data that is used to recover 2D paths derived from the camera into 3D paths, with flexibility to scale processing depending on the particular application and accuracy to be implemented (by including optional inputs and via use of alternative methods).

Fusion module for increasing completeness and accuracy of detections by checking diversity and integrating paths derived from multiple sensors.

Flexibility to support multiple different sensors of the same type, allowing for intra-sensor consistency checking of paths as well as consolidation of multiple paths from the same sensor type.

Support for strong partitioning of vital (state machine/deterministic) consolidation and supervision functionality, in applications using vital processing. For example, vital functions and vital partitions are able to be developed in compliance with CENELEC standards for rail (e.g., CENELECT EN 50126 and 50129).

Advantages

Robustness: At least one embodiment disclosed herein increases the robustness of the detector by fusing multiple sensor data. Different sensors have different characteristics that affect quality of detected paths. For example, camera sensors cannot detect paths when images are obtained at nighttime while LiDAR can detect paths regardless of weather condition and lighting condition. On the other hand, the density of LiDAR decreases with increasing range, resulting in fewer ground points (or track points). At least one embodiment disclosed herein compensates for the shortcomings of different sensors through a fusion process combined with logic operations. This design allows at least one embodiment to robustly detect paths regardless of different weather and lighting conditions.

High accuracy: At least one embodiment disclosed herein increases the accuracy and completeness of extracted paths by integrating Passive 2D Sensors and Active 3D Sensors. With accurate multi-sensor calibration before a training operation, at least one embodiment accurately integrates paths detected from different sensor data through diversity check and integration processes in a fusion module. Also, at least one embodiment is designed to increase the accuracy of sensor-level path extractions. Active 3D path extractors use track points and empty regions (observed in the side of track or on the track due to the high incident angle) as track evidence to increase the accuracy of extracted paths.

Fully Automated: At least one embodiment is fully automated, eliminating heavy pre-processing and initialization processes. The relationship among multiple sensors is expressed by the reference frame (bogie frame) that provides a fixed relation between a train and the path of the train. The reference frame automatically provides the initial track position of a path to be extracted by individual sensors. Also, the detectors are designed to input raw sensor data without any pre-processing process such as subsampling and data editing, and to output paths so that the detectors do not involve manual work.

Scalability: In at least one embodiment, detectors are modularized to increase scalability. Embodiments described herein include two sensor pipelines (LiDAR pipeline and camera pipeline) and one fusion pipeline. Sensor pipeline inputs sensor data and outputs independent paths while the fusion pipeline collects outputs of a sensor pipeline and outputs accurate paths in a fully automated manner. Thus, a new sensor pipeline is able to be added to the designed system.

FIG. 1 is a block diagram of an Overall Path Extraction Architecture 100 for CMPE according to at least one embodiment.

In accordance with at least one embodiment, the path extraction system receives input data frames from multiple sensors. A data frame refers to the data and metadata output by a sensor at a given instant in time, corresponding to measurement and processing operations performed by the sensor during a brief time period preceding that instant. For example, a single camera image, or a single LiDAR point cloud, are considered a single data frame.

In FIG. 1, the Overall Path Extraction Architecture 100 includes Active 3D Sensor Path Extraction module 110, Ground Surface Model Generation module 120, Passive 2D Path Extraction module 130, and Fusion module 140. Overall Path Extraction Architecture 100 for CMPE (or simply "the system") receives data frames from sensor modalities. The system 100 receives the data frames from the sensors corresponding to measurements performed at a given instant in time. The system includes multiple sensor pipelines (two sensor processing pipelines in at least one embodiment—Active 3D Sensor pipeline input 112 and Passive 2D Sensor pipeline input 132—but is able to be extended if redundant sensor types are available; see RMPE described with reference to FIGS. 6A-B below). Active or Passive 3D Sensor (e.g., LiDAR, Radar) input 122 is provided to 3D Sensor Ground Surface Model Generator 120. System 100 also includes Path Fusion 140, and Supervision 150 that includes 3D Path Diversity Check 151, 3D Path Plausibility Check 152, 3D Path Historical Diversity Check 153, 3D Path Consistency Check 154. The sensor pipelines are processed in parallel and subsequent Path Fusion 140, and Supervision 150 modules are executed when output of a sensor pipeline is available. Sensors of system 100 begin collecting data at power-on. In response to being triggered, path extraction software, for example Active 3D Sensor Path Extraction module 110, Ground Surface Model Generation module 120, or Passive 2D Path Extraction module 130, requests the data from the sensors, sensor buffers, sensor gateway, or the like, and starts to process path extraction.

Active 3D Sensor Path Extractor 110 receives active 3D sensor input 112, such as LiDAR or Radar, and Constraints 114, such as gauge, Radius of Curvature (ROC), grade, or the like. In respect of currently-available technology, the CMPE is preferably implemented with LiDAR (as an Active 3D sensor) and visible-spectrum camera (as a Passive 2D sensor). As sensing technology becomes less expensive, other Active 3D Sensors (e.g., Imaging Radar) and Passive 2D Sensors (e.g., LWIR) are able to be incorporated in embodiments described herein. The industrial applications of at least one embodiment include automatic path extraction, switch determination systems, driving assistance systems, and/or object detection systems for vehicles or robots travelling along a known, fixed route.

Other LiDAR-based path extraction methods use highly dense survey LiDAR data (using airborne laser scanning (ALS), mobile laser scanning (MLS) or unmanned aircraft system (UAS)) where track head points are clearly observed. Other algorithms extract the track head points as evidence of a rail track by applying various classic clustering algorithms such as region growing, RANSAC, K-means clustering and EM-GMM clustering based on the geometric shapes of rail track and then model 3D rail path by connecting the head points or by tracking the head points. However, when a low-density LiDAR sensor is horizontally mounted on the vehicle (sensor installation method in mobile autonomy applications), track points are hardly observed due to a large incident angle and track material. Thus, other path extraction methods cannot be used to extract rail path because the other path extraction methods were designed to extract a path with the assumption that track points are well detected from LiDAR data.

Active 3D Sensor Path Extractor 110 accounts for the physical characteristics of reflection of the active sensor signal from the top-of-rail. LiDAR and Radar sensor signals will not strongly backreflect from smooth metal, with the absence of diffuse scattering leading to low signal return in backreflected direction, and few sample points from the top-of-rail/rail head/track head. Thus, standard methods that make use of signals returned from the top-of-rail/rail head are not sufficient in real operation, and one or more embodiments of the method presented herein resolves this problem.

Active 3D Sensor Path Extractor 110 relies on extracting a particular 3D point pattern in which two empty lines (i.e., with no 3D point returns), representing the locations of the left and right rails of the track, are obtained in-between dense regions of backreflection points. As mentioned above, this phenomenon occurs due to the shallow incident angles of the sensor (e.g., greater than 45 degrees to the vertical) and the nature of the metal rail, e.g., the incident signal will reflect away from the sensor resulting in no returns from the rails. Active 3D Sensor Path Extractor 110 extracts tracks in cases of low to nonexistent rail head backreflection, which is different from the standard methods used in LiDAR survey path/track extraction. While LiDAR survey methods rely on extracting track head points for rail point extraction, this is not possible for LiDARs with significantly less point density than survey LiDARs. Similarly, the Active 3D Sensor Path Extractor 110 extracts the track based on the reflections from the ground and absence of reflections from the rail due to the incident angle. In addition, the orientation of the speed vectors provides a secondary cross-check of estimated track curvature in the case of a Doppler speed measuring sensor, such as Radar.

Passive 2D Sensor Path Extractor 130 relies first on a multi-task deep neural network model for track point prediction. Then, the candidate paths from the track points are created. Passive 2D Sensor Path Extractor 130 relies on two steps: (1) creation of track segments from track points by point clustering, and (2) creation of the candidate paths from track segments by linking the track segments. The multi-task deep neural network model combines a semantic segmentation network with a regression branch to predict track points in an image. In particular, the regression branch is designed to produce pixelwise output including the center-ness (i.e., how close a pixel is to the center of a track) and horizontal distance to a left rail and a right rail. The regression branch and its combination with the semantic segmentation network are one of the novel aspects of embodiments described herein.

3D Sensor Ground Surface Model Generator 120 receives the passive 2D sensor path extracted by Passive 2D Sensor Path Extraction module 130 based on the Passive 2D Sensor pipeline input 132, and receives Active or Passive 3D Sensor input 122 to generate a 3D sensor ground surface model. The passive 2D path (expressed by a set of vertices) in image space is transformed to a line vector in a local frame of the respective 3D sensor (used to generate the surface model), using database-stored 2D-3D Calibration parameters 124.

Passive 3D Path Generator 126 recovers the missing single dimension of Passive 2D sensor path extracted by Passive 2D Sensor Path Extractor 130 by integrating a surface model generated by 3D Sensor Ground Surface Model Generator 120. Passive 3D Path Generator 126 receives Constraints 128, e.g., track gauge, Radius of Curvature (ROC), grade, or the like. The 3D path is recovered by intersecting the line vector and plane generated by 3D Sensor Ground Surface Model Generator 120. Supervision 150 generates alarms when the time difference between surface model and 2D sensor frame data is larger than a user-defined threshold, e.g., 1 second, e.g., a time difference between LiDAR ground points and camera.

Supervision 150 includes 3D Path Diversity Check 151. 3D Path Diversity Check 151 receives the Active 3D sensor path generated by Active 3D Sensor Path Extractor 110 and the passive 3D path generated by Passive 3D Path Generator 126. 3D Path Diversity Check 151 compares the previous fused path (generated in previous time epoch, corresponding to a window of time of length p) with the current path (generated by sensor pipeline, and that is assumed to include additional path data, e.g., at long range from the vehicle). 3D Path Diversity Check 151 creates a buffer along the previous fused path and overlaps the buffer with vertices of the current path. The buffer tolerance interval at a point is defined with respect to the predetermined deviation, and in respect of the expected error in the path from the Passive 2D Sensor Path Extractor 130 and Active 3D Sensor Path Extractor 110. The ratio in the buffer based on the vertices in the previous fused path and the vertices of the current path is calculated and a determination is made whether the current path passes a diversity check based on the ratio being above a predetermined value. Note that there is a supervision that alarms a low value of the ratio. The buffer threshold according to at least one embodiment is 30 cm. The buffer ratio is the number of vertices (current path) inside the buffer (generated from previous fused path)/the number of total vertices (current path)*100. The diversity check is passed in response to the buffer ratio being greater than 90%. However, those skilled in the art recognize that the buffer ratio value of 90% is able to be set to another predetermined value. The diversity check fails in response to the buffer ratio being less than the predetermined value, e.g., 50%, 75%, or the like.

Diverse Sensors 3D Path Consolidation ("Path Fusion") 140 receives the active 3D sensor path from Active 3D Sensor Path Extractor 110, input from the 3D Path Diversity Check 151, and the passive 3D path from Passive 3D Path Generator 126. Diverse Sensors 3D Path Consolidation ("Path Fusion") 140 integrates the previous path inertial measurements, $z^{-p} \cdots {}^{-1}$ 142, with the current path when the 3D Path Diversity Check 151 is successful. Vertices of the current path within the buffer mentioned in 3D Path Diversity Check 151 are collected and the vertices are used to calculate spline parameters. Diverse Sensors 3D Path Consolidation ("Path Fusion") 140 is configurable for performance (i.e., the union of the two, or sections of the two, may be used; i.e., a portion of vertices of the previous path may be used in case that current path is significantly shorter than the previous path), or may be configured for integrity (i.e., the intersection of the two paths).

After new spline parameters are estimated, vertices are sampled in regular intervals to generate a final, accurate path. Diverse Sensors 3D Path Consolidation ("Path Fusion") 140 does not rely on ordered outputs from Active 3D Sensor Path Extractor 110 and Passive 3D Path Generator 126 as input. Diverse Sensors 3D Path Consolidation ("Path Fusion") 140 keeps the latest fused path and integrates the latest fused path with new input. Diverse Sensors 3D Path Consolidation ("Path Fusion") 140 outputs a highly-accurate and highly-complete fused path. Highly-accurate refers to a path generated from one sensor data that is confirmed by the other sensor data, which increases accuracy. Highly-complete refers to a path generated from one sensor that partly misses a part of a complete path due to the sensor characteristics. A missing part of a path is able to be completed by fusing other sensor data by Diverse Sensors 3D Path Consolidation ("Path Fusion") 140.

3D Path Plausibility Check 152 receives the output from Diverse Sensors 3D Path Consolidation ("Path Fusion") 140 and Constraints 160, e.g., track gauge, ROC, grade, or the like. 3D Path Plausibility Check 152 subdivides the current path (forward-looking path) into sections (of configurable size) and (where possible depending on available information for the network) confirms the following 3D path plausibility parameters (in order of priority):

Path is smooth, without kinks of breaks;

Path has the correct track gauge;

Path has acceptable Radius of Curvature (ROC) (greater than expected minimum);

Path has acceptable grade (within expected bounds);

Path has acceptable hill and sag (within expected bounds);

Path has acceptable track transition curve (within expected guidelines); and

Path has acceptable superelevation/crosslevel (within expected bounds), e.g., as defined by standards.

One, multiple, or all of these checks may be performed, depending on processing power and performance of onboard sensors (where higher available power and more performant sensors support higher-order checks).

3D Path Historical Diversity Check 153 receives input from 3D Path Plausibility Check 152 and Inertial Sensor Input 170. 3D Path Historical Diversity Check 153 compares a past traversed path (from past window of size k) to the path determined from past inertial measurements in window of size k, $z^{-k} \cdots {}^{-1}$ 172. The check is performed similar to 3D Path Diversity Check 151 in comparison of two 3D paths, with a predetermined deviation at a point in consideration of IMU noise. As described above, according to at least one embodiment the threshold is 30 cm. Moreover, 3D Path Historical Diversity Check 153 accounts for traversed branch points by comparison of both paths and is able to subsequently use this information to determine the traveled branch (i.e., the branch that corresponds with a successful diversity check). 3D Path Historical Diversity Check 153 confirms that the past traversed path can be trusted and that the past traversed path matches at least one of the fused 3D paths extracted in the past behind the current vehicle position. 3D Path Historical Diversity Check 153 also identifies which of potentially two paths (at a branch) was the traversed (and thus the correct) past traversed path.

3D Path Consistency Check 154 receives the output from 3D Path Historical Diversity Check 153 and Constraints 162, e.g., track gauge, ROC, grade, or the like. 3D Path Consistency Check 154 also receives past fused objects $z^{-m \cdots -1}$ 174. 3D Path Consistency Check 154 uses the past and current (forward) path to verify no continuity breaks or 'kinks', and to confirm that the checks outlined in 3D Path Plausibility Check 152 are maintained across historical and current path information. 3D Path Consistency Check 154 provides the Fused 3D Path 180 as an output.

Figure 2:
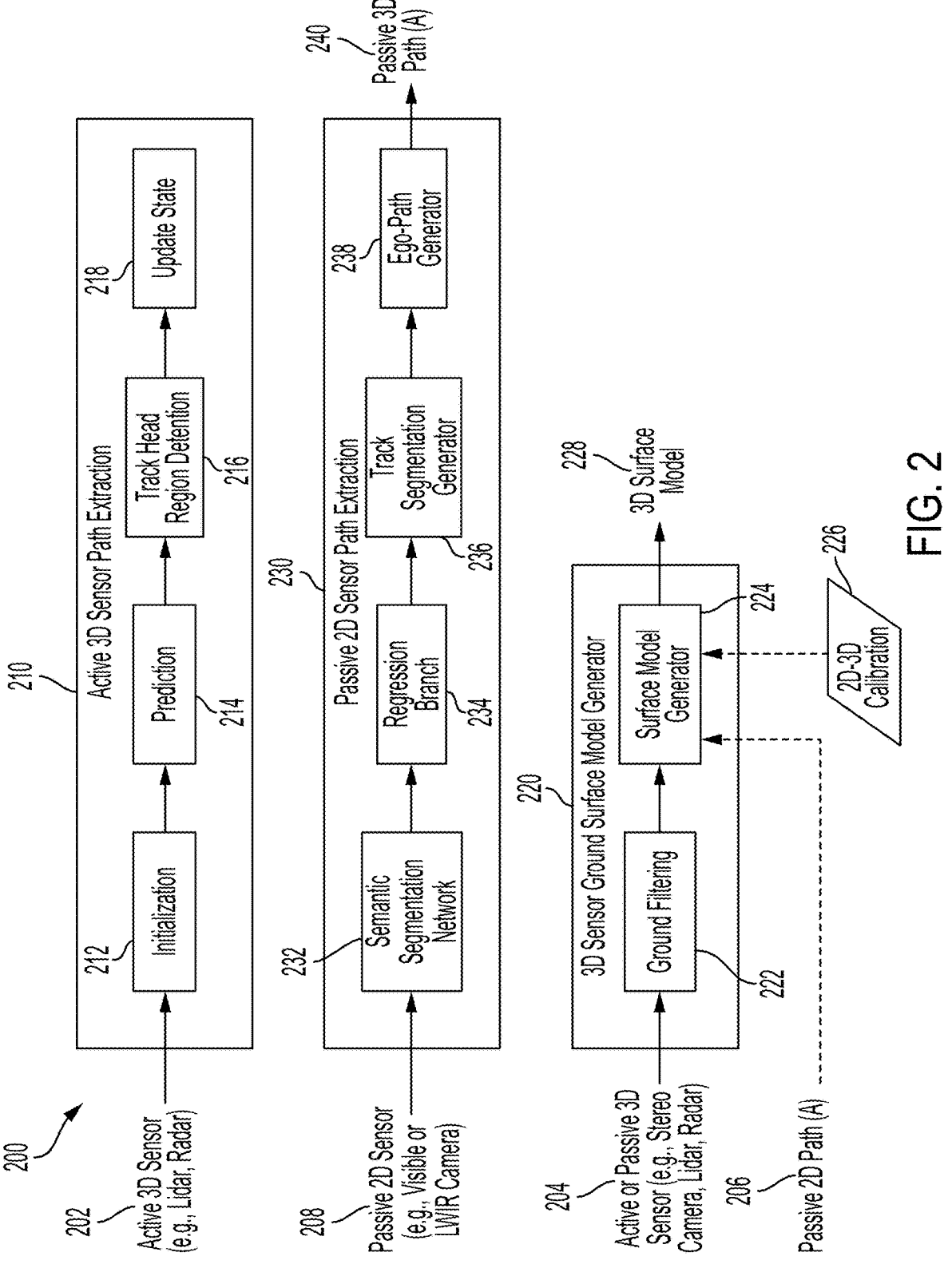
FIG. 2 is a block diagram showing further details of Active and Passive Sensors, and a Surface Model Generator according to at least one embodiment.

FIG. 2 is a block diagram 200 showing further details of Active and Passive Sensors, and a Surface Model Generator according to at least one embodiment.

In FIG. 2, Active 3D Sensor Path Extractor 210 includes Initialization 212, Prediction 214, Track Head Region Detection 216 and Update State 218. Initialization 212 receives Active 3D Sensor input 202 and automatically determines start points (left and right rail tracks) and direction of tracks in a frame data. A pair of track windows with user defined (parametrized) length and width are used to capture the physical relation between tracks and to constrain the subsequent track extraction during path tracking. In at least one embodiment, this may be, for example, 1 m by 0.4 m for a track window, when the track gauge is 1.5 m. However, those skilled in the art recognize that embodiments described herein are not meant to be limited to these example dimensions, and that embodiments described herein are able to use other dimensions. Initial position of rails is determined by searching regions, generated by considering the minimum distance of ground points (calculated using sensor installation configuration) and maximum curvature. Candidate positions of a pair of track windows are created along the cross section at regular intervals.

Prediction 214 receives the candidate positions from Initialization 210 to predict a next state vector including position (x, y and z) and direction based on the previous state vector in a Kalman Filter framework.

Track Head Region Detection 216 receives the next state vector from Prediction 212. Track Head Region Detection 216 determines observations of track head in the Kalman Filter framework. Track Head Region Detection 216 is applied to the candidates of a pair of track windows to find an initial track region. When a track head track region is found, the candidate position is considered the initial track region. Note that multiple initial track regions can be detected for multiple track regions. Also, Track Head Region Detection 216 provides the direction of the track.

Update State 218 provides an update state vector predicted by Prediction 212 using observations derived from Track Head Region Detection 216 in the Kalman Filter framework.

3D Sensor Ground Surface Model Generator 220 includes Ground Filtering 222 and Surface Model Generator 224. Ground Filtering 222 receives Active or Passive 3D Sensor input 204 (e.g., LiDAR, Imaging Radar, or stereo camera) and divides LiDAR points into ground points and non-ground points based on grid-based filtering method constrained by a slope. After generating a grid and assigning LiDAR points into the grid, 3D Sensor Ground Filtering 222 collects the lowest points in a grid. Ground seed points are selected by comparing k-nearest lowest points in terms of distance and slope. Then, ground points are detected by collecting points below a certain height from the ground seed points. The remaining points are considered as non-ground points. Surface Model Generator 224 receives 2D-3D Calibration 226 and creates a surface model from either Active Or Passive 3D Sensor input 204 assuming that ground surface is modeled by a plane within one frame data. The plane parameters are calculated using, for example, a least square method applied to a subset of the input 3D sensor data. To select the subset, one or a combination of methods may be used:

1) Unconstrained Approach: Ground points are used to fit a plane.
2) Loosely-Constrained Approach: Instead of using all ground points, this approach uses points that belong to the region generated in consideration of maximum curvature of rail design.
3) Path-Constrained Approach: This approach uses the subset of ground points that corresponds to the available Passive 2D path information 206 (+/−configurable buffer).

Regardless of the approach used to select the plane-fitting subset, the plane parameters are updated whenever new 3D sensor frame data is input. The particular approach to be used depends on the operational environment (less complex track geometry favors less constrained approach; open-cut and/or hilly terrain may favor a more constrained approach), the processing power available in the particular platform configuration (less power available favors a less constrained approach), the integrity requirements (higher integrity requirements favor a more constrained approach), or the required extraction performances (e.g., extraction range, where shorter range requirement favors a less constrained approach). The output of Surface Model Generator 224 is a 3D Surface Model 228.

Passive 2D Sensor Path Extraction 230 receives Passive 2D Sensor input 208 at Semantic Segmentation Network 232. In the context of camera-based path extraction, Semantic Segmentation Network 232 receives data frames from a camera. Semantic Segmentation Network 232 implements a deep neural network having an encoder-decoder structure. Semantic Segmentation Network 232 is combined with Regression Branch 234, which is trained with comprehensive data sets. The output of Semantic Segmentation Network 232 is a feature map, which is used by Regression Branch 234.

Regression Branch 234 creates pixel-wise information for a track, from the combination of the feature map provided by Semantic Segmentation Network 232. The information includes (i) the degree of being a center point of a track, (ii) the horizontal distance to the left rail of the track, and (iii) the horizontal distance to the right rail of the track, for a pixel in the given input image. Regression Branch 234 implements three sub-branches, which perform convolution operations, to create the three types of information.

Track Segment Generator 236 receives pixel-wise information for a track from Regression Branch 234. The input image splits into sub-regions, i.e., non-overlapping windows, where the window has a width equal to the image width and has a certain height. Then, in a window, track center points, which are pixels with a high value of the degree of being a center point of a track, are clustered into track segments by clustering spatially neighboring track center points into one group. The output of Track Segment Generator 236 is the list of track segments in windows.

Ego-Path Generator 238 receives track segments from Track Segment Generator 236. On a basis of track segments in a window, a tree is built to represent topological information about paths. Starting from a track segment located around the center in the bottom-most window as a start node, clustering of spatially neighboring track segments over two neighboring windows is performed. When a track segment in a window is spatially close to two different track segments in the upper window, that track segment is considered as a junction of paths, i.e., a diverging point at a turnout. The resulting tree has the following three types of nodes: (1) start node, which indicates a point where a path starts, (2) end node, which indicates a point where a path ends, and (3) switch node, which indicates a diverging point in a path. An edge between nodes includes a trajectory between the nodes, where the trajectory includes track center points and corresponding left and right rail points. On a basis of the tree, the possible ego-paths are obtained by simply traversing from an end node to a start node. The output of Ego-Path Generator 238 is the possible ego-paths, Passive 2D Paths 240, where an ego-path is a trajectory that includes track center points and corresponding left and right rail points for the path.

Figure 3:
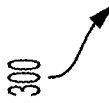
FIG. 3 is a plan view of a vehicle on a track according to at least one embodiment.

FIG. 3 is a plan view of a vehicle on a track 300 according to at least one embodiment.

In FIG. 3, a Vehicle 310 is shown on a Track 312. Vehicle 310 includes one or more Sensors 314. Sensors 314 observe two Track Windows 320, 322. Sensors 314 cover a Track Region with Curvature Constraint 330. Track 312 falls within the Track Region with Curvature Constraint 330. Track Windows 320, 322 are aligned with Rail 1 340 and Rail 2 342 of Track 312, respectively. Track Windows 320, 322 are defined by a Length 350 and a Width 352. Track Windows 320, 322 are separated so that the distance between the approximate center of Track Windows 320, 322 aligns with the Separation 360 between Rail 1 340 and Rail 2 342 of Track 312. One or more Sensors 314 determine track head points by investigating the statistics of points belonging to Track Windows 320, 322.

Figure 4:
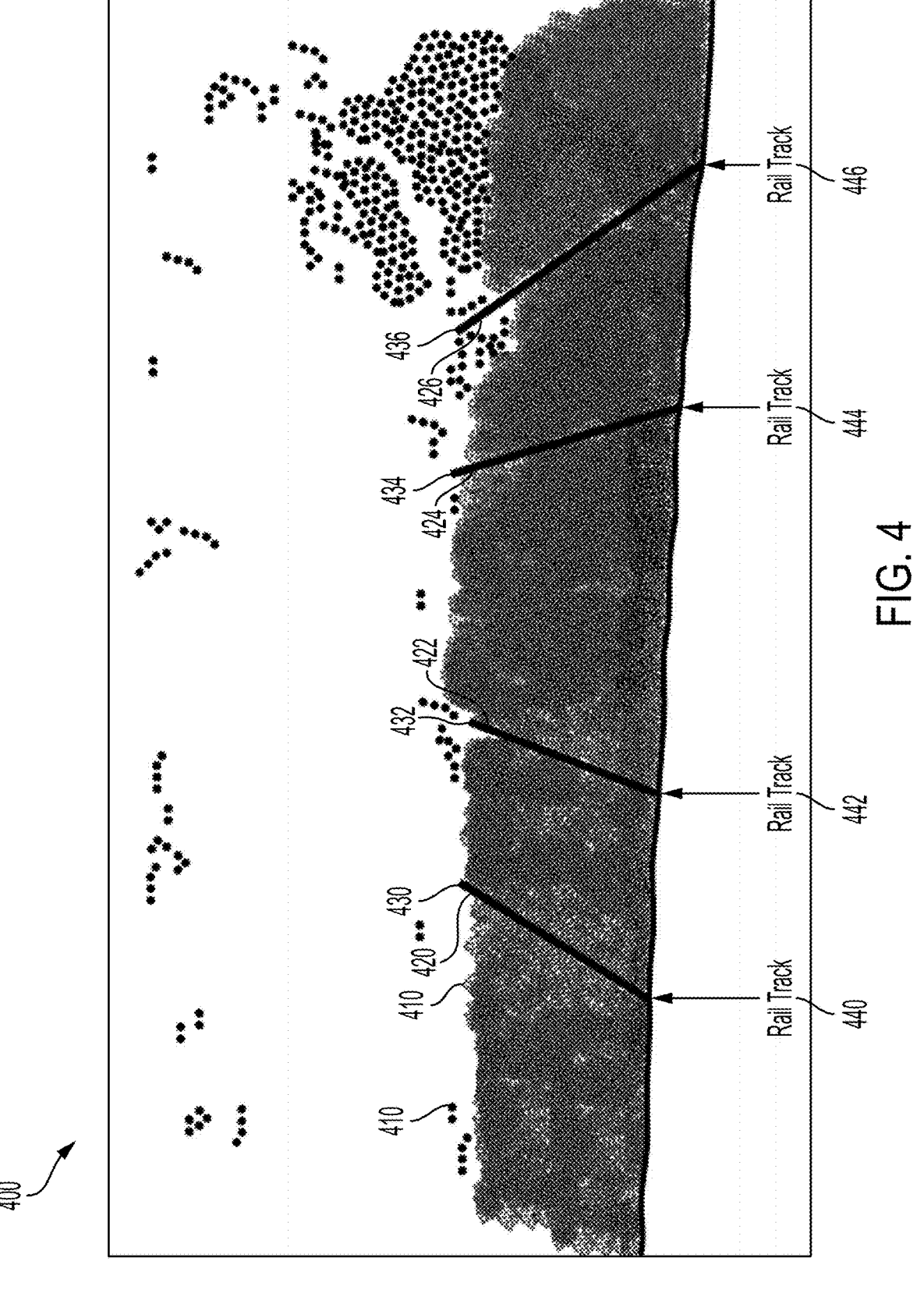
FIG. 4 is a view of a sensor result according to at least one embodiment.

FIG. 4 is a view of a sensor result 400 according to at least one embodiment.

In FIG. 4, Reflected Points 410 from one or more sensors are shown. Empty Regions 420, 422, 424, 426 for track heads are observed in Track Head Regions 430, 432, 434, 436 due to the low density of onboard LiDAR data and installation constraints. The Empty Regions 420, 422, 424, 426 represent the Rail Tracks 440, 442, 444, 446. The Empty Regions 420, 422, 424, 426 are due to low diffuse scattering resulting from high incidence angle and the geometric relationship between reflected wave phase in relation to roughness of the reflection surface. Unlike other path extraction methods, at least one embodiment disclosed herein uses track head points as well as Empty Regions 420, 422, 424, 426 that are observed in track head region due to the low density of onboard LiDAR data and installation constraints.

Figure 5:
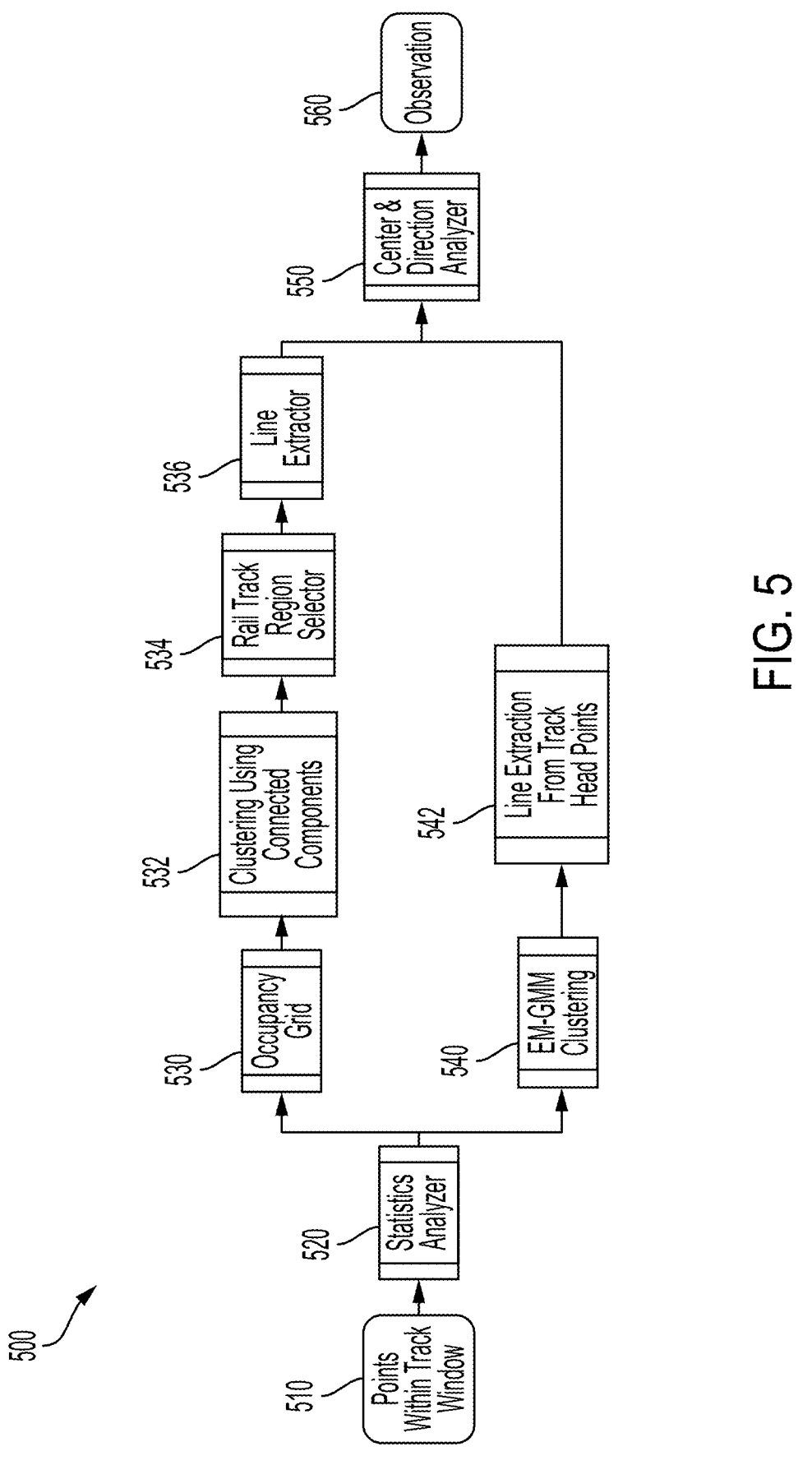
FIG. 5 is a block diagram of a Track Head Region Detector according to at least one embodiment.

FIG. 5 is a block diagram of a Track Head Region Detector 500 according to at least one embodiment.

In FIG. 5, Track Head Region Detector 500 checks if track head points exist by investigating the statistics of Points Within Track Window 510. The check for track head points is accomplished by analysis of distribution of height and/or continuity of points across the rail profile.

Points Within Track Window 510 are provided to Statistic Analyzer 520. When the Statistic Analyzer 520 indicates that there are track head points based on a distribution of height and/or continuity of points across the rail profile, the Statistic Analyzer 520 divides points belonging to track window into track head, web and bed (including ground points) based on a distribution segmentation or clustering approach, such as the Expectation Maximization-Gaussian Mixture Model (EM-GMM) clustering 540. Line Extractor 542 generates a line representing the cluster by fitting track head points to a line using Random Sample Consensus (RANSAC). RANSAC is an iterative method to estimate parameters of a mathematical model from a set of observed data that includes outliers, when outliers are to be accorded no influence on the values of the estimates. Therefore, the RANSAC of Line Extractor 542 also can be interpreted as an outlier detector. Center & Direction Analyzer 550 produces Observations 560. Observations 560 include the center and direction of the line.

When the Statistic Analyzer 520 indicates that there are no track head points, Track Head Region Detector 500 tries to find an empty region caused due to high incidence angle. Occupancy Grid 530 is generated using points belonging to track window and non-occupant pixels are clustered using Clustering of Connected Components algorithm 532. Clustering of Connected Components algorithm 532 provides the cluster for track head to Rail Track Region Selector 534. Rail Track Region Selector 534 detects a track head by analyzing a linearity of a cluster. Line Extractor 536, similar to the track head case, generates a line representing the cluster using a RANSAC algorithm. Center & Direction Analyzer 550 produces Observations 560. Observations 560 include the center and direction of the line.

Figure 6A:
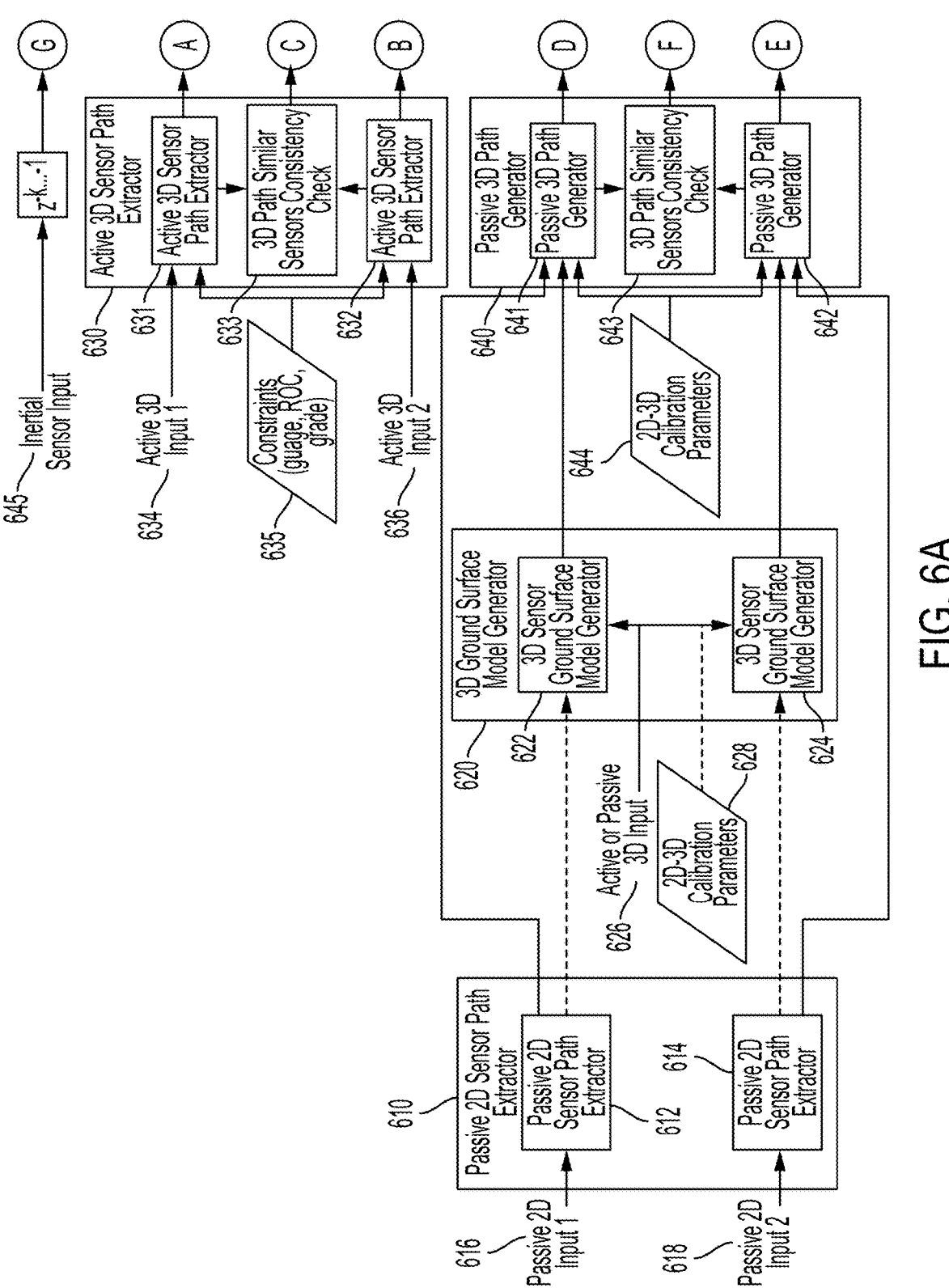
FIGS. 6A-B illustrate a block diagram of Redundant Multi-Sensor Path Extraction (RMPE) according to at least one embodiment.
Figure 6B:
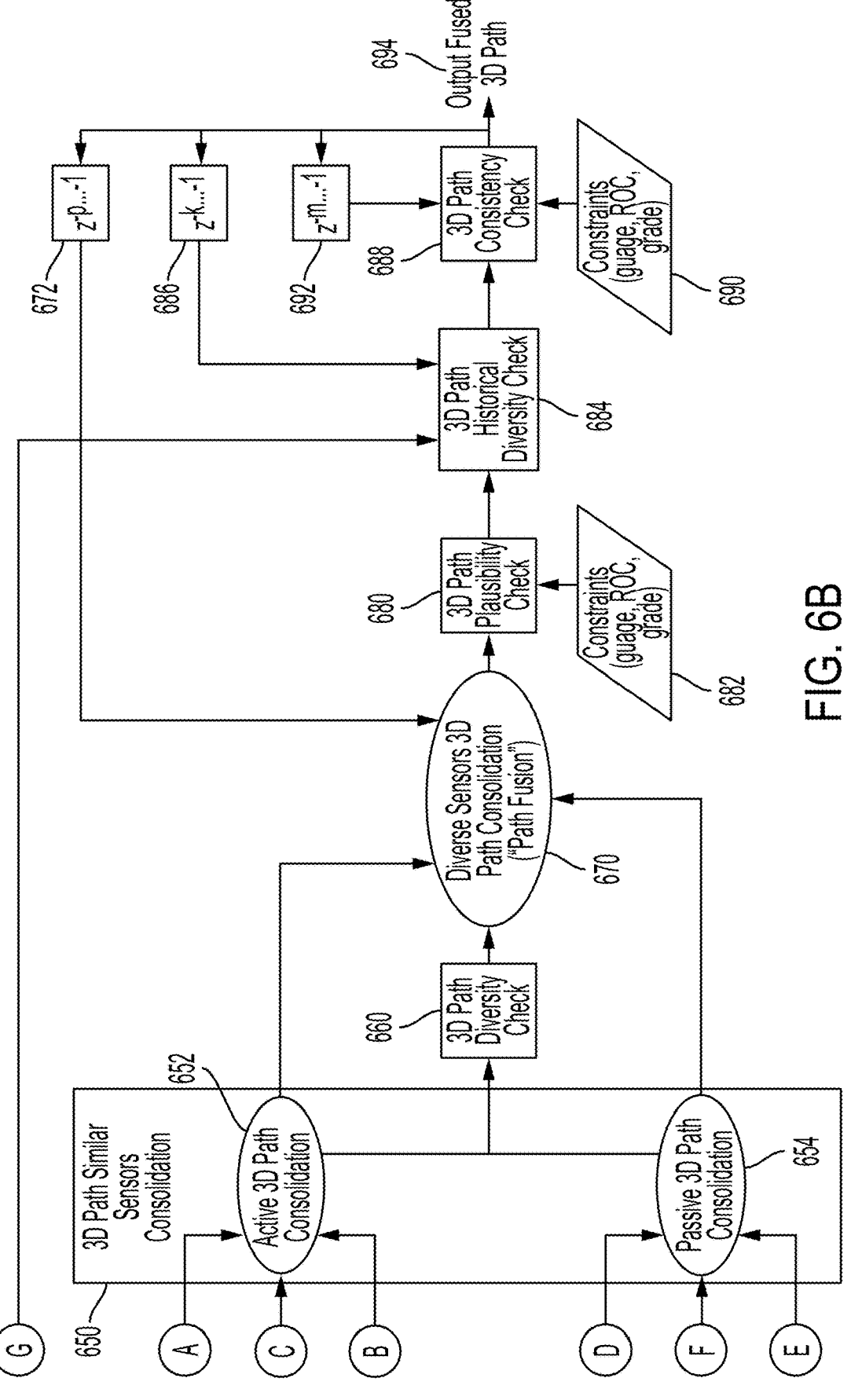

FIGS. 6A-B are a block diagram of Redundant Multi-Sensor Path Extraction (RMPE) 600 according to at least one embodiment.

RMPE system 600 is used when there are multiple redundant sensors of a given type in the architecture (e.g., two Active 3D sensors, such as LiDAR and Radar, with two Passive 2D sensors, such as LWIR and visible camera). FIGS. 6A-B are flowcharts of configuration of such processing architecture.

In FIG. 6A, a Passive 2D Sensor Path Extractor 610 includes two Passive 2D Sensor Path Extractors 612, 614. Passive 2D Input 1 616 is provided to Passive 2D Sensor Path Extractors 612, and Passive 2D Input 2 618 is provided to Passive 2D Sensor Path Extractors 614.

3D Ground Surface Model Generator 620 includes 3D Ground Surface Model Generators 622, 624. Active or Passive 3D Input 626 is provided to 3D Ground Surface Model Generators 622, 624. 3D Ground Surface Model Generators 622, 624 also receive 2D-3D Calibration Parameters 628.

Redundant Multi-Sensor Path Extraction (RMPE) 600 further includes Active 3D Sensor Path Extractor 630 and Passive 3D Path Generator 640. Active 3D Sensor Path Extractor 630 includes Active 3D Sensor Path Extractor 631, Active 3D Sensor Path Extractor 632, and 3D Path Similar Sensors Consistency Check 633.

Active 3D Sensor Path Extractor 631 receives Active 3D Sensor (e.g., LiDAR, radar) measurements as Active 3D Input 1 634 and Constraints 635. Active 3D Sensor Path Extractor 632 receives Active 3D Sensor (e.g., LiDAR, radar) measurements as Active 3D Input 2 636 and Constraints 635. Active 3D Sensor Path Extractor 631 and Active 3D Sensor Path Extractor 632 account for the physical characteristics of reflection of the active sensor signal from the top-of-rail. LiDAR and Radar sensor signals will not strongly backreflect from smooth metal, with the absence of diffuse scattering leading to low signal return in a backreflected direction, and few sample points from the top-of-rail/rail head/track head. Active 3D Sensor Path Extractor 631 and Active 3D Sensor Path Extractor 632 extract a particular 3D point pattern in which two empty lines (i.e., with no 3D point returns) are determined in-between dense regions of backreflected points, wherein the two empty lines represent the locations of the left and right rails of the track. Active 3D Sensor Path Extractor 631 and Active 3D Sensor Path Extractor 632 extract the track based on the reflections from the ground and absence of reflections from the rail due to the incident angle. In addition, the orientation of the speed vectors provides a secondary crosscheck of estimated track curvature in the case of Doppler speed measuring sensor, such as Radar.

3D Path Similar Sensors Consistency Check 633 compares output of two or more Active 3D paths. 3D Path Similar Sensors Consistency Check 633 is similar to that described by 3D Path Diversity Check 660 described herein below, with tolerances defined appropriately in respect of the various sensor path extraction tolerances.

Active 3D Sensor Path Extractor 631 produces an Active 3D Sensor Path as Output A, Active 3D Sensor Path Extractor 632 produces an Active 3D Sensor Path as Output B, and 3D Path Similar Sensors Consistency Check 633 produces an indication of similarity between the Active 3D Sensor path from Active 3D Sensor Path Extractor 631 and the Active 3D Sensor path from Active 3D Sensor Path Extractor 632 as Output C. 3D Path Similar Sensors Consistency Check 633 produces a consistency flag of 1 in response to two outputs being consistent, and 0 in response to two outputs not being consistent.

Passive 3D Path Generator 640 includes Passive 3D Path Generator 641, Passive 3D Path Generator 642, and 3D Path Similar Sensors Consistency Check 643.

Passive 3D Path Generator 641 receives the output of Passive 2D Sensor Path Extractor 612, output of 3D Sensor Ground Surface Model Generator 622, and 2D-3D Calibration Parameters 644. Passive 3D Path Generator 642 receives the output of Passive 2D Sensor Path Extractor 614, output of 3D Sensor Ground Surface Model Generator 624, and 2D-3D Calibration Parameters 644.

Passive 3D Path Generator 641 and Passive 3D Path Generator 642 recover the missing single dimension of passive 2D sensor paths derived by Passive 2D Sensor Path Extractor 612 from Passive 2D Sensor Input 1 616 and by Passive 2D Sensor Path Extractor 614 from Passive 2D Sensor Input 2 618, respectively. Passive 3D Path Generator 641 and Passive 3D Path Generator 642 generate passive 3D paths by integrating a surface model generated from 3D Sensor Ground Surface Model Generator 622 and 3D Sensor Ground Surface Model Generator 624, respectively. Passive 2D sensor paths (expressed by a set of vertices) in image space is transformed by Passive 2D Sensor Path Extractor 612, 614, respectively, to a line vector in a local frame of the respective 3D sensor (used to generate the surface model), using database-stored 2D-3D Calibration Parameters 644. A 3D path is recovered by intersecting the line vector and plane generated by 3D Sensor Ground Surface Model Generators 622, 624, respectively. Note that the system has supervision logic that alarms when the time difference between 3D sensor ground surface model from 3D Sensor Ground Surface Model Generators 622, 624, respectively, and 2D sensor frame data is larger than user-defined threshold. For example, according to at least one embodiment the user-defined threshold is 1 second.

3D Path Similar Sensors Consistency Check 643 receives the output of Passive 3D Path Generator 641, and the output of Passive 3D Path Generator 642. 3D Path Similar Sensors Consistency Check 643 compares two or more Passive 3D paths, respectively, to assess the similarity and alarm if paths are outside of a predetermined tolerance. For example, according to at least one embodiment the predetermined tolerance is 15 cm.

Passive 3D Path Generator 641 produces a Passive 3D Sensor Path as Output D, Passive 3D Path Generator 642 produces a Passive 3D Sensor Path as Output E, and 3D Path Similar Sensors Consistency Check 643 produces an indication of similarity between the Passive 3D Sensor path from Passive 3D Sensor Path Extractor 641 and the Passive 3D Sensor path from Passive 3D Sensor Path Extractor 642 Output F. Inertial Sensor Input 645 is provided at Output G.

Referring to FIG. 6B, 3D Path Similar Sensors Consolidation 650 includes Active 3D Path Consolidation 652 and Passive 3D Path Consolidation 654. Active 3D Path Consolidation 652 receives active 3D sensor path from Active 3D Sensor Path Extractor 631 at Input A, active 3D sensor path from Active 3D Sensor Path Extractor 632 at Input B, and Input C from 3D Path Similar Sensors Consistency Check 633. Passive 3D Path Consolidation 654 receives passive 3D path from Passive 3D Path Generator 641 at Input D, passive 3D path from Passive 3D Path Generator 642 at Input E, and Input F from 3D Path Similar Sensors Consistency Check 643. Active 3D Path Consolidation 652 integrates active 3D sensor path from Active 3D Sensor Path Extractor 631 and active 3D sensor path from Active 3D Sensor Path Extractor 632. Passive 3D Path Consolidation 654 integrates passive 3D path from Passive 3D Path Generator 641 and passive 3D path from Passive 3D Path Generator 642.

Active 3D Path Consolidation 652 and Passive 3D Path Consolidation 654 provide integrated active 3D path and integrated passive 3D path as input to 3D Path Diversity Check 660. 3D Path Diversity Check 660 compares the previous fused path (generated in previous time epoch, corresponding to a window of time of length p) with the current path (generated by sensor pipeline, and that is assumed to include additional path data, e.g., at long range from the vehicle). 3D Path Diversity Check 660 creates a buffer along the previous fused path and overlaps the buffer with vertices of the current path. The buffer tolerance interval at a point is defined with respect to a predetermined deviation, and in respect of the expected error in the passive 2D sensor paths from Passive 2D Sensor Path Extractors 612, 614, respectively, and active 3D sensor paths from Active 3D Sensor Path Extractors 632, 633, respectively. The ratio in the buffer based on the vertices in the previous fused path and the vertices in the current path is calculated and a determination is made whether the current path passes a diversity check at 3D Path Diversity Check 660 based on the ratio being above a predetermined value. Note that there is a supervision that alarms a low value of the ratio.

Active 3D Path Consolidation 652, Passive 3D Path Consolidation 654, and 3D Diversity Check 660 provide input to Diverse Sensors 3D Path Consolidation ("Path Fusion") 670. Diverse Sensors 3D Path Consolidation ("Path Fusion") 670 also receives previous path inertial measurements $z^{-p \cdots -1}$ 672.

Diverse Sensors 3D Path Consolidation ("Path Fusion") 670 functions similar to 3D Path Similar Sensors Consolidation 650, including Active 3D Path Consolidation 652 for active path consolidation, and Passive 3D Path Consolidation 654 for passive path consolidation. Diverse Sensors 3D Path Consolidation ("Path Fusion") 670 is configurable for performance (i.e., output union of two paths within tolerances) or integrity (i.e., output the intersection of the two paths within tolerances). This feature allows for flexibility depending on use case(s) and/or sensor choice.

Diverse Sensors 3D Path Consolidation ("Path Fusion") 670 integrates the previous path inertial measurements, $z^{-p \cdots -1}$ 672, with the current path when the 3D Path Diversity Check 660 is successful. Vertices of the current path within the buffer mentioned in 3D Path Diversity Check 660 are collected and the vertices are used to calculate spline parameters. Note that Diverse Sensors 3D Path Consolidation ("Path Fusion") 670 is configurable for performance (i.e., the union of the two, or sections of the two, may be used; i.e., a portion of vertices of the previous path may be used in case that current path is significantly shorter than the previous path), or may be configured for integrity (i.e., the intersection of the two paths). Once new spline parameters are estimated, vertices are sampled in regular intervals to generate a final accurate path. Diverse Sensors 3D Path Consolidation ("Path Fusion") 670 does not rely on ordered outputs from sensor pipelines as input. Diverse Sensors 3D Path Consolidation ("Path Fusion") 670 keeps the latest fused path and integrates the latest fused path with new input. Diverse Sensors 3D Path Consolidation ("Path Fusion") 670 outputs a highly-accurate and highly-complete fused path.

Diverse Sensors 3D Path Consolidation ("Path Fusion") 670 provides a fused 3D path to 3D Path Plausibility Check 680. 3D Path Plausibility Check 680 also receives Constraint 682. 3D Path Plausibility Check 680 subdivides the current path (forward-looking path) into sections (of configurable size) and (where possible depending on available information for the network) confirms the following 3D path plausibility parameters (in order of priority):

Path is smooth, without kinks of breaks;

Path has the correct track gauge;

Path has acceptable radius of curvature (greater than expected minimum);

Path has acceptable grade (within expected bounds);

Path has acceptable hill and sag (within expected bounds);

Path has acceptable track transition curve (within expected guidelines); and

Path has acceptable superelevation/crosslevel (within expected bounds), e.g., as defined by standards.

One, multiple, or all of these checks may be performed, depending on processing power and performance of onboard sensors (where higher available power and more performant sensors support higher-order checks).

3D Path Plausibility Check 680 provides input to 3D Path Historical Diversity Check 684. 3D Path Historical Diversity Check 684 compares past traversed path (from past window of size k) to path determined from past inertial measurements $z^{-k \cdots -1}$ from Input G from Inertial Sensor Input 645 and $z^{-k \cdots -1}$ 686 in window of size k. 3D Path Historical Diversity Check 684 is performed similar to 3D Path Diversity Check 660 in comparison of two 3D paths, with a predetermined deviation at a point in consideration of IMU noise. Moreover, the 3D Path Historical Diversity Check 684 accounts for traversed branch points by comparison of both paths and subsequently uses this information to determine the traveled branch (i.e., the branch that corresponds with a successful diversity check). 3D Path Historical Diversity Check 684 confirms that the past traversed path is able to be trusted and matches at least one of the Fused 3D Paths 694 extracted in the past behind the current vehicle position. 3D Path Historical Diversity Check 684 also identifies which of potentially two paths (at a branch) was the traversed (and thus the correct) past traversed path.

3D Path Historical Diversity Check 684 provides input to 3D Path Consistency Check 688. 3D Path Consistency Check 688 also receives input from Constraint 690 and past inertial measurements, $z^{-m \cdots -1}$ 692. 3D Path Consistency Check 688 uses the past path inertial measurements, $z^{-m \cdots -1}$ 692, and current (forward) path to verify that there are no continuity breaks or "kinks", and to confirm that the checks outlined in 3D Path Plausibility Check 680 are maintained across historical and current path information.

3D Path Consistency Check 688 provides Fused 3D Path 694 at an output. Fused 3D Path 694 is provided to paths $z^{-p \cdots -1}$ 672, $z^{-k \cdots -1}$ 686, and $z^{-m \cdots -1}$ 692.

FIG. 7 is a flowchart 700 of a method for performing path extraction for a vehicle on a guideway according to at least one embodiment.

In FIG. 7, the process starts S702 and two or more sensor inputs are received from two or more sensors including at least one active 3D sensor input from at least one active 3D sensor and at least one passive 2D sensor input from at least one passive 2D sensor S710. Referring to FIG. 6A, a Passive 2D Sensor Path Extractor 610 includes two Passive 2D Sensor Path Extractors 612, 614. Passive 2D Input 1 616 is provided to Passive 2D Sensor Path Extractors 612, and Passive 2D Input 2 618 is provided to Passive 2D Sensor Path Extractors 614. Active 3D Sensor Path Extractor 631 receives Active 3D Sensor (e.g., LiDAR,radar) measurements as Active 3D Input 1 634 and Constraints 635. Active 3D Sensor Path Extractor 632 receives Active 3D Sensor (e.g., LiDAR, radar) measurements as Active 3D Input 2 636 and Constraints 635.

At least one active 3D sensor path is extracted based on the at least one active 3D sensor input and at least one passive 2D sensor path is extracted based on the at least one passive 2D sensor input S714. Referring to FIG. 6A, Active 3D Sensor Path Extractor 631 receives Active 3D Sensor (e.g., LiDAR, radar) measurements as Active 3D Input 1 634 and Constraints 635. Active 3D Sensor Path Extractor 632 receives Active 3D Sensor (e.g., LiDAR,radar) measurements as Active 3D Input 2 636 and Constraints 635. Active 3D Sensor Path Extractor 631 and Active 3D Sensor Path Extractor 632 account for the physical characteristics of reflection of the active sensor signal from the top-of-rail. LiDAR and Radar sensor signals will not strongly backreflect from smooth metal, with the absence of diffuse scattering leading to low signal return in backreflected direction, and few sample points from the top-of-rail/rail head/track head. Active 3D Sensor Path Extractor 631 and Active 3D Sensor Path Extractor 632 extract a particular 3D point pattern in which two empty lines (i.e., with no 3D point returns) are determined in-between dense regions of backreflected points, wherein the two empty lines represent the locations of the left and right rails of the track. Active 3D Sensor Path Extractor 631 and Active 3D Sensor Path Extractor 632 extract the track based on the reflections from the ground and absence of reflections from the rail due to the incident angle. In addition, the orientation of the speed vectors provides a secondary cross-check of estimated track curvature in the case of a Doppler speed measuring sensor, such as Radar.

At least one 3D sensor ground surface model is generated based on the at least one passive 2D sensor path S718. Referring to FIG. 6A, Passive 3D Path Generator 641 and Passive 3D Path Generator 642 generate passive 3D paths by integrating a surface model generated from 3D Sensor Ground Surface Model Generator 622 and 3D Sensor Ground Surface Model Generator 624, respectively.

At least one passive 3D path is generated based on the at least one passive 2D sensor path and the at least one 3D sensor ground surface model S722. Referring to FIG. 6A, Passive 3D Path Generator 641 and Passive 3D Path Generator 642 recover the missing single dimension of passive 2D sensor paths derived by Passive 2D Sensor Path Extractor 612 from Passive 2D Sensor Input 1 616 and by Passive 2D Sensor Path Extractor 614 from Passive 2D Sensor Input 2 618, respectively. Passive 2D sensor paths (expressed by a set of vertices) in image space are transformed by Passive 2D Sensor Path Extractor 612, 614, respectively, to line vector in local frame of the respective 3D sensor (used to generate the surface model), using database-stored 2D-3D Calibration Parameters 644. 3D path is recovered by intersecting the line vector and plane generated by 3D Sensor Ground Surface Model Generators 622, 624, respectively.

A first supervision check including at least one active 3D path similar sensors consistency check for the at least one active 3D sensor path and at least one passive 3D path similar sensors consistency check for the at least one passive 3D path is performed to verify an integrity of the at least one active 3D sensor path and the at least one passive 3D path S726. Referring to FIG. 6A, 3D Path Similar Sensors Consistency Check 633 compares output of two or more Active 3D paths. 3D Path Similar Sensors Consistency Check 633 is similar to that described by 3D Path Diversity Check 660 described herein below, with tolerances defined appropriately in respect of the various sensor path extraction tolerances. 3D Path Similar Sensors Consistency Check 643 receives the output of Passive 3D Path Generator 641, and the output of Passive 3D Path Generator 642. 3D Path Similar Sensors Consistency Check 643 compares two or more Passive 3D paths, respectively, to assess the similarity and alarm if paths are outside of a predetermined tolerance.

A second supervision check including a 3D path diversity check is performed in a path extraction pipeline S730. Referring to FIG. 6B, Active 3D Path Consolidation 652 and Passive 3D Path Consolidation 654 provide integrated active 3D path and integrated passive 3D path as input to 3D Path Diversity Check 660. 3D Path Diversity Check 660 compares the previous fused path (generated in previous time epoch, corresponding to a window of time of length p) with the current path (generated by sensor pipeline, and that is assumed to include additional path data, e.g., at long range from the vehicle). 3D Path Diversity Check 660 creates a buffer along the previous fused path and overlaps the buffer with vertices of the current path. The buffer tolerance interval at a point is defined with respect to the predetermined deviation, and in respect of the expected error in the passive 2D sensor paths from Passive 2D Sensor Path Extractors 612, 614, respectively, and active 3D sensor paths from Active 3D Sensor Path Extractors 632, 633, respectively. The ratio in the buffer based on the vertices in the previous fused path and the vertices of the current path is calculated and a determination is made whether the current path passes a diversity check at 3D Path Diversity 660 based on the ratio being above a predetermined value.

The at least one passive 3D path and the at least one active 3D sensor path are fused to produce a consolidated 3D path S734. Referring to FIG. 6B, Diverse Sensors 3D Path Consolidation ("Path Fusion") 670 functions similar to 3D Path Similar Sensors Consolidation 650, including Active 3D Path Consolidation 652 for active path consolidation, and Passive 3D Path Consolidation 654 for passive path consolidation. Diverse Sensors 3D Path Consolidation ("Path Fusion") 670 is configurable for performance (i.e., output union of two paths within tolerances) or integrity (i.e., output the intersection of the two paths within tolerances). This feature allows for flexibility depending on use case(s) and/or sensor choice. Diverse Sensors 3D Path Consolidation ("Path Fusion") 670 integrates the previous path inertial measurements, $z^{-p \cdots -1}$ 672, with the current path when the 3D Path Diversity Check 660 is successful. Vertices of the current path within the buffer mentioned in 3D Path Diversity Check 660 are collected and the vertices are used to calculate spline parameters. Note that Diverse Sensors 3D Path Consolidation ("Path Fusion") 670 is configurable for performance (i.e., the union of the two, or sections of the two, may be used; i.e., a portion of vertices of the previous path may be used in case that current path is significantly shorter than the previous path), or may be configured for integrity (i.e., the intersection of the two paths). Once new spline parameters are estimated, vertices are sampled in regular intervals to generate a final accurate path. Diverse Sensors 3D Path Consolidation ("Path Fusion") 670 does not rely on ordered outputs from sensor pipelines as input. Diverse Sensors 3D Path Consolidation ("Path Fusion") 670 keeps the latest fused path and integrates the latest fused path with new input. Diverse Sensors 3D Path Consolidation ("Path Fusion") 670 outputs highly-accurate and highly-complete fused path.

A third supervision check including a 3D path plausibility check is performed in the path extraction pipeline after the consolidated 3D path is produced S738. Referring to FIG. 6B, Diverse Sensors 3D Path Consolidation ("Path Fusion") 670 provides a fused 3D path to 3D Path Plausibility Check 680. 3D Path Plausibility Check 680 also receives Constraint 682. 3D Path Plausibility Check 680 subdivides the current path (forward-looking path) into sections (of configurable size) and (where possible depending on available information for the network) confirms the following 3D path plausibility parameters (in order of priority):

Path is smooth, without kinks of breaks;

Path has the correct track gauge;

Path has acceptable radius of curvature (greater than expected minimum);

Path has acceptable grade (within expected bounds);

Path has acceptable hill and sag (within expected bounds);

Path has acceptable track transition curve (within expected guidelines); and

Path has acceptable superelevation/crosslevel (within expected bounds), e.g., as defined by standards.

One, multiple, or all of these checks may be performed, depending on processing power and performance of onboard sensors (where higher available power and more performant sensors support higher-order checks).

A fourth supervision check including a 3D path historical diversity check is performed in the path extraction pipeline after the 3D path plausibility check S742. Referring to FIG. 6B, 3D Path Plausibility Check 680 provides input to 3D Path Historical Diversity Check 684. 3D Path Historical Diversity Check 684 compares past traversed path (from past window of size k) to path determined from past inertial measurements $z^{-k \cdots -1}$ from Input G from Inertial Sensor Input 645 and $z^{-k \cdots -1}$ 686 in window of size k. 3D Path Historical Diversity Check 684 is performed similar to 3D Path Diversity Check 660 in comparison of two 3D paths, with a predetermined deviation at a point in consideration of IMU noise. Moreover, the 3D Path Historical Diversity Check 684 accounts for traversed branch points by comparison of both paths and subsequently uses this information to determine the traveled branch (i.e., the branch that corresponds with a successful diversity check). 3D Path Historical Diversity Check 684 confirms that the past traversed path is able to be trusted and matches at least one of the Fused 3D Paths 694 extracted in the past behind the current vehicle position. 3D Path Historical Diversity Check 684 also identifies which of potentially two paths (at a branch) was the traversed (and thus the correct) past traversed path.

A fifth supervision check including a 3D path consistency check is performed in the path extraction pipeline after the 3D path historical diversity check S746. Referring to FIG. 6B, 3D Path Historical Diversity Check 684 provide input to 3D Path Consistency Check 688. 3D Path Consistency Check 688 also receives input from Constraint 690 and past inertial measurements, $z^{-m \cdots -1}$ 692. 3D Path Consistency Check 688 uses the past path inertial measurements, $z^{-m\cdots-1}$ 692, and current (forward) path to verify that there are no continuity breaks or "kinks", and to confirm that the checks outlined in 3D Path Plausibility Check 680 are maintained across historical and current path information.

The process then ends S750.

In at least one embodiment, a method of path extraction for a vehicle on a guideway includes receiving two or more sensor inputs from two or more sensors including at least one active 3D sensor input from at least one active 3D sensor and at least one passive 2D sensor input from at least one passive 2D sensor, extracting at least one active 3D sensor path based on the at least one active 3D sensor input and at least one passive 2D sensor path based on the at least one passive 2D sensor input, generating at least one 3D sensor ground surface model based on the at least one passive 2D sensor path, generating at least one passive 3D path based on the at least one passive 2D sensor path and the at least one 3D sensor ground surface model, fusing the at least one passive 3D path and the at least one active 3D sensor path to produce a consolidated 3D path, and performing, in a path extraction pipeline, at least one supervision check for providing integrity to the consolidated 3D path.

Figure 8:
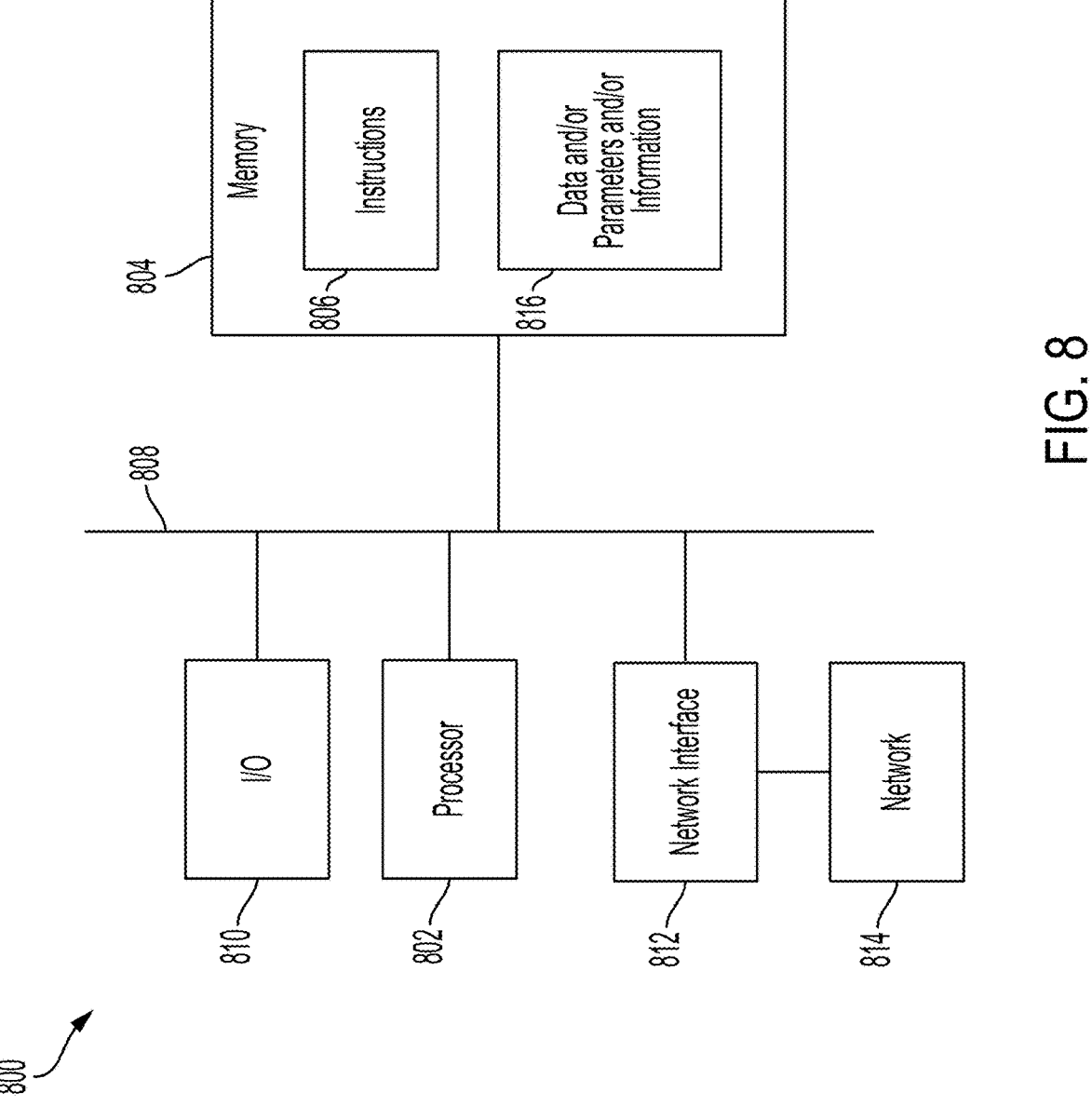
FIG. 8 is a schematic view of a system for performing path extraction, in accordance with at least one embodiment.

FIG. 8 is a schematic view of a system 800 for performing path extraction, in accordance with at least one embodiment.

In FIG. 8, system 800 includes a hardware processor 802 and a non-transitory, computer readable storage medium 804 encoded with, i.e., storing, the computer program code 806, i.e., a set of executable instructions. The processor 802 is electrically coupled to the computer readable storage medium 804 via a bus 808. The processor 802 is also electrically coupled to an I/O interface 810 by bus 808. A network interface 812 is also electrically connected to the processor 802 via bus 808. Network interface 812 is connected to a network 814, so that processor 802 and computer readable storage medium 804 are capable of connecting to external elements via network 814. The processor 802 is configured to execute the computer program code 806 encoded in the computer readable storage medium 804 in order to cause system 800 to be usable for performing a portion or all of the processes or methods in accordance with one or more of the embodiments as described above.

In some embodiments, the processor 802 is a central processing unit (CPU), a multi-processor, a distributed processing system, an application specific integrated circuit (ASIC), and/or a suitable processing unit.

In some embodiments, the computer readable storage medium 804 is an electronic, magnetic, optical, electromagnetic, infrared, and/or a semiconductor system (or apparatus or device). For example, the computer readable storage medium 804 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 804 includes a compact disk-read only memory (CD-ROM), a compact disk-read/write (CD-R/W), and/or a digital video disc (DVD).

In some embodiments, the storage medium 804 stores the computer program code 806 configured to cause system 800 to perform a method as described herein. In some embodiments, the storage medium 804 also stores information used for performing the method as well as information generated during performing the method, such as data and/or parameters and/or information 816 and/or a set of executable instructions 806 to perform the processes or methods in accordance with one or more of the embodiments as described above.

System 800 includes I/O interface 810. I/O interface 810 is coupled to external circuitry. In some embodiments, I/O interface 810 includes a keyboard, keypad, mouse, trackball, trackpad, and/or cursor direction keys for communicating information and commands to processor 802.

System 800 also includes network interface 812 coupled to the processor 802. Network interface 812 allows system 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-1394. In some embodiments, the method is implemented in two or more systems 800, and information is exchanged between different systems 800 via network 814.

System 800 is configured to receive information through I/O interface 810. The information is transferred to processor 802 via bus 808.

Accordingly, in at least one embodiment, Processor 802 executes Instructions 806 stored on the one or more Non-Transitory, Computer-Readable Storage Medium 804 to receive two or more sensor inputs from two or more sensors including at least one active 3D sensor input from at least one active 3D sensor and at least one passive 2D sensor input from at least one passive 2D sensor. Processor 802 extracts at least one active 3D sensor path based on the at least one active 3D sensor input and at least one passive 2D sensor path is extracted based on the at least one passive 2D sensor input. Processor 802 generates at least one 3D sensor ground surface model based on the at least one passive 2D sensor path. Processor 802 generates at least one passive 3D path based on the at least one passive 2D sensor path and the at least one 3D sensor ground surface model. Processor 802 performs at first supervision check including at least one active 3D path similar sensors consistency check for the at least one active 3D sensor path and at least one passive 3D path similar sensors consistency check for the at least one passive 3D path to verify an integrity of the at least one active 3D sensor path and the at least one passive 3D path. Processor 802 performs a second supervision check including a 3D path diversity check in a path extraction pipeline. Processor 802 fuses the at least one passive 3D path and the at least one active 3D sensor path to produce a consolidated 3D path. Processor 802 performs a third supervision check including a 3D path plausibility check in the path extraction pipeline after the consolidated 3D path is produced. Processor 802 performs a fourth supervision check including a 3D path historical diversity check in the path extraction pipeline after the 3D path plausibility check. Processor 802 performs a fifth supervision check including a 3D path consistency check in the path extraction pipeline after the 3D path historical diversity check.

Accordingly, at least one embodiment provides a high-integrity, accurate train path and switch position using multi-sensor data. In at least one embodiment, the problem domain is constrained to determining track segments from single-sensor pipelines. In at least one embodiment, track detections is performed across several frames. In at least one embodiment, one or more supervisions (as well as fusion) are implemented to mitigate the risk of sensor failure and algorithm errors to provide high-integrity of the estimated path.

Embodiments described herein include advantages over other path extraction methods by providing a multi-sensor approach for estimating the path that supplies robustness by compensating for the shortcomings of different sensors. Embodiments described herein allows robust detections paths regardless of different weather and lighting conditions. In addition, at least one embodiment increases the accuracy of extracted paths by integrating the path estimation of the fused path considering multi-sensor calibration transformation. At least one embodiment also provides a fully automated process to determine the train path using low-resolution COTS sensors instead of high-performance sensors used during survey.

Other methods of path extraction rely on offline processing. When all point data over the scene are collected, one or more embodiments of the methods can extract rail path by initializing the start point of the rail path, clustering and modeling rail track. Rail extraction in other methods relies on traditional computer vision techniques that involve ad-hoc setting of parameters, depending on the given scenes. Other path extraction methods are susceptible to scene changes, including changes in site, illumination, and weather, and are thus not applicable to real world cases, where the scene changes frequently happen. Moreover, tracks in the real world include several types of complex paths such as merging paths and diverging paths. However, the other path extraction methods operate in limited cases, e.g., single track case.

Complementary Multi-Sensor Path Extraction (CMPE) according to at least one embodiment is able to use low-density LiDAR data and for providing ground surface model, which is used to recover 3D path from 2D path generated from passive 2D data. Online path extraction is used to progressively extract rail track including near the sensor and far away from the sensor using the Kalman filter. Unlike other approaches, embodiments described herein detect a track head region instead of track head points, considering a scan pattern for rail track and its adjacent ground observed in low-density LiDAR sensor data. The center of a detected track head region is used as observations in an update process of the Kalman filter to extract rail path using a low-density LiDAR where track head points are not observed. Also, CMPE according to at least one embodiment is able to extract ground points using a slope-constrained grid-based ground filtering method and generates a surface model assuming that a ground surface can be modeled as a plane in a local region (in the loosely-constrained approach). The generated surface model is used to recover 3D information of 2D path generated by passive 2D data. Thus, 3D paths generated from Active 3D Sensor and Passive 2D Sensor can be directly fused in fusion pipeline, which simplifies the fusion process and supports vital partitioning in high-criticality applications. Considerations for partitioning of mixed SIL components are governed by the CENELEC standards (e.g., CENELEC EN 50126, and 50129)

Redundant Multi-Sensor Path Extraction (RMPE) according to at least one embodiment includes additional similar sensors consistency and consolidation functionality that allows for future implementations that could use multiple similar sensor types, to maximize performance and/or integrity. To accommodate the use of multiple similar sensor types, consolidation is configurable to maximize performance, or integrity, by using the union or intersection (respectively) of valid path points (where valid indicates that the particular path point has passed similar sensors consistency check).

The foregoing outlines features of several embodiments so that those skilled in the art may better understand the aspects of the embodiments described herein. Those skilled in the art appreciate that embodiments disclosed herein are able to be used as a basis for designing or modifying other processes and structures for carrying out the same purposes and/or achieving the same advantages of the embodiments introduced herein. Those skilled in the art also realize that such equivalent constructions do not depart from the spirit and scope of the embodiments described herein, and various changes, substitutions, and alterations are able to be made herein without departing from the spirit and scope of the embodiments described herein.

What is claimed is:

1. A method of path extraction for a vehicle on a guideway, comprising:

receiving two or more sensor inputs from two or more sensors including at least one active 3D sensor input from at least one active 3D sensor and at least one passive 2D sensor input from at least one passive 2D sensor;

extracting at least one active 3D sensor path based on the at least one active 3D sensor input and at least one passive 2D sensor path based on the at least one passive 2D sensor input;

generating at least one 3D sensor ground surface model based on the at least one passive 2D sensor path;

generating at least one passive 3D path based on the at least one passive 2D sensor path and the at least one 3D sensor ground surface model;

fusing the at least one passive 3D path and the at least one active 3D sensor path to produce a consolidated 3D path; and performing, in a path extraction pipeline, at least one supervision check for providing integrity to the consolidated 3D path.

2. The method of claim 1, wherein the performing, in the path extraction pipeline, the at least one supervision check for providing the integrity to the consolidated 3D path includes, prior to the fusing the at least one passive 3D path and the at least one active 3D sensor path to produce the consolidated 3D path, performing, in the path extraction pipeline, a 3D path diversity check, the 3D path diversity check incudes:

receiving the at least one active 3D sensor path and the at least one passive 3D path;

performing the 3D path diversity check based on the at least one active 3D sensor path and the at least one passive 3D path to generate a 3D path diversity check status indicating one of success or failure of the 3D path diversity check; and based on the 3D path diversity check status indicating one of success or failure of the 3D path diversity check, generating the consolidated 3D path.

3. The method of claim 1, wherein the performing, in the path extraction pipeline, the at least one supervision check for providing the integrity to the consolidated 3D path includes, after the fusing the at least one passive 3D path and the at least one active 3D sensor path to produce the consolidated 3D path, performing a 3D path plausibility check in the path extraction pipeline, the 3D path plausibility check includes:

receiving the consolidated 3D path; and performing the 3D path plausibility check on the consolidated 3D path by determining whether the consolidated 3D path satisfies one or more 3D path plausibility parameters.

4. The method of claim 3, wherein the determining whether the consolidated 3D path satisfies the one or more 3D path plausibility parameters includes determining whether the consolidated 3D path meets at least one of: is smooth, without kinks of breaks, has a correct track gauge, has an acceptable Radius of Curvature (ROC), has an acceptable grade within predetermined grade bounds, has acceptable hill and sag within predetermined hill and sag bounds, has acceptable track transition curve, or has acceptable superelevation/crosslevel within predetermined superelevation/crosslevel bounds.

5. The method of claim 1, wherein the performing, in the path extraction pipeline, the at least one supervision check for providing the integrity to the consolidated 3D path includes, after the fusing the at least one passive 3D path and the at least one active 3D sensor path to produce the consolidated 3D path, performing a 3D path historical diversity check in the path extraction pipeline, the 3D path historical diversity check including:

receiving a past traversed path from a past window of size k;

receiving a past inertial measurements in the window of size k;

based on the past traversed path from the past window of size k and the past inertial measurements in the window of size k, determining a trustworthiness of the past traversed path; and based on the trustworthiness, determining whether the past traversed path matches the consolidated 3D path.

6. The method of claim 1, wherein the performing, in the path extraction pipeline, the at least one supervision check for providing the integrity to the consolidated 3D path includes, after the fusing the at least one passive 3D path and the at least one active 3D sensor path to produce the consolidated 3D path, performing a 3D path consistency check in the path extraction pipeline, the 3D path consistency check includes:

receiving the consolidated 3D path;

receiving a past traversed path; and verifying the consolidated 3D path includes no continuity breaks.

7. The method of claim 1, wherein the performing, in the path extraction pipeline, the at least one supervision check for providing the integrity to the consolidated 3D path includes, after the fusing the at least one passive 3D path and the at least one active 3D sensor path to produce the consolidated 3D path, performing at least one active 3D path similar sensors consistency check for the at least one active 3D sensor path and to check that the at least one active 3D sensor path is within a predetermined active 3D sensor path tolerance, and at least one passive 3D path similar sensors consistency check for the at least one passive 3D path and to check that the at least one passive 3D path is within a predetermined passive 3D path tolerance.

8. A path extractor, comprises:

a memory storing computer-readable instructions; and a processor connected to the memory, wherein the processor is configured to execute the computer-readable instructions to perform operations to:

receive two or more sensor inputs from two or more sensors including at least one active 3D sensor input from at least one active 3D sensor and at least one passive 2D sensor input from at least one passive 2D sensor;

extract at least one active 3D sensor path based on the at least one active 3D sensor input and at least one passive 2D sensor path based on the at least one passive 2D sensor input;

generate at least one 3D sensor ground surface model based on the at least one passive 2D sensor path;

generate at least one passive 3D path based on the at least one passive 2D sensor path and the at least one 3D sensor ground surface model;

fuse the at least one passive 3D path and the at least one active 3D sensor path to produce a consolidated 3D path; and perform, in a path extraction pipeline, at least one supervision check for providing integrity to the consolidated 3D path.

9. The path extractor of claim 8, wherein the processor is further configured to perform, in the path extraction pipeline, the at least one supervision check for providing the integrity to the consolidated 3D path by:

prior to fusing the at least one passive 3D path and the at least one active 3D sensor path to produce the consolidated 3D path, performing, in the path extraction pipeline, a 3D path diversity check, wherein the processor performs the 3D path diversity check by:

receiving the at least one active 3D sensor path and the at least one passive 3D path;

performing the 3D path diversity check based on the at least one active 3D sensor path and the at least one passive 3D path to generate a 3D path diversity check status indicating one of success or failure of the 3D path diversity check; and based on the 3D path diversity check status indicating one of success or failure of the 3D path diversity check, generating the consolidated 3D path.

10. The path extractor of claim 8, wherein the processor is further configured to perform, in the path extraction pipeline, the at least one supervision check for providing the integrity to the consolidated 3D path by:

after fusing, the at least one passive 3D path and the at least one active 3D sensor path to produce the consolidated 3D path, performing a 3D path plausibility check in the path extraction pipeline, wherein the processor performs the 3D path plausibility check by:

receiving the consolidated 3D path; and performing the 3D path plausibility check on the consolidated 3D path by determining whether the consolidated 3D path satisfies one or more 3D path plausibility parameters.

11. The path extractor of claim 10, wherein the processor is further configured to determine whether the consolidated 3D path satisfies the one or more 3D path plausibility parameters by determining whether the consolidated 3D path meets at least one of: is smooth, without kinks of breaks, has a correct track gauge, has an acceptable Radius of Curvature (ROC), has an acceptable grade within predetermined grade bounds, has acceptable hill and sag within predetermined hill and sag bounds, has acceptable track transition curve, or has acceptable superelevation/crosslevel within predetermined superelevation/crosslevel bounds.

12. The path extractor of claim 8, wherein the processor is further configured to perform, in the path extraction pipeline, the at least one supervision check for providing the integrity to the consolidated 3D path by:

after fusing, the at least one passive 3D path and the at least one active 3D sensor path to produce the consolidated 3D path, performing a 3D path historical diversity check in the path extraction pipeline, the processor performing the 3D path historical diversity check by:

receiving a past traversed path from a past window of size k;

receiving a past inertial measurements in the past window of size k;

based on the past traversed path from the past window of size k and the past inertial measurements in the past window of size k, determining a trustworthiness of the past traversed path; and based on the trustworthiness, determining whether the past traversed path matches the consolidated 3D path.

13. The path extractor of claim 8, wherein the processor is further configured to perform, in the path extraction pipeline, the at least one supervision check for providing the integrity to the consolidated 3D path includes, after fusing the at least one passive 3D path and the at least one active 3D sensor path to produce the consolidated 3D path, performing a 3D path consistency check in the path extraction pipeline, wherein the processor performs the 3D path consistency check by:

receiving the consolidated 3D path;

receiving a past traversed path; and verifying the consolidated 3D path includes no continuity breaks.

14. The path extractor of claim 8, wherein the processor is further configured to perform, in the path extraction pipeline, the at least one supervision check for providing the integrity to the consolidated 3D path by, after fusing the at least one passive 3D path and the at least one active 3D sensor path to produce the consolidated 3D path:

performing at least one active 3D path similar sensors consistency check for the at least one active 3D sensor path to assess a similarity and that the at least one active 3D sensor path is within a predetermined active 3D sensor path tolerance, and performing at least one passive 3D path similar sensors consistency check for the at least one passive 3D path and to check that the at least one passive 3D path is within a predetermined passive 3D path tolerance.

15. A non-transitory computer-readable media having computer-readable instructions stored thereon, which when executed by a processor causes the processor to perform operations comprising:

receiving two or more sensor inputs from two or more sensors including at least one active 3D sensor input from at least one active 3D sensor and at least one passive 2D sensor input from at least one passive 2D sensor;

extracting at least one active 3D sensor path based on the at least one active 3D sensor input and at least one passive 2D sensor path based on the at least one passive 2D sensor input;

generating at least one 3D sensor ground surface model based on the at least one passive 2D sensor path;

generating at least one passive 3D path based on the at least one passive 2D sensor path and the at least one 3D sensor ground surface model;

fusing the at least one passive 3D path and the at least one active 3D sensor path to produce a consolidated 3D path; and performing, in a path extraction pipeline, at least one supervision check for providing integrity to the consolidated 3D path.

16. The non-transitory computer-readable media of claim 15, wherein the performing, in the path extraction pipeline, the at least one supervision check for providing the integrity to the consolidated 3D path includes, prior to the fusing the at least one passive 3D path and the at least one active 3D sensor path to produce the consolidated 3D path, performing, in the path extraction pipeline, a 3D path diversity check, the 3D path diversity check incudes:

receiving the at least one active 3D sensor path and the at least one passive 3D path;

performing the 3D path diversity check based on the at least one active 3D sensor path and the at least one passive 3D path to generate a 3D path diversity check status indicating one of success or failure of the 3D path diversity check; and based on the 3D path diversity check status indicating one of success or failure of the 3D path diversity check, generating the consolidated 3D path.

17. The non-transitory computer-readable media of claim 15, wherein the performing, in the path extraction pipeline, the at least one supervision check for providing the integrity to the consolidated 3D path includes, after the fusing the at least one passive 3D path and the at least one active 3D sensor path to produce the consolidated 3D path, performing a 3D path plausibility check in the path extraction pipeline, the 3D path plausibility check includes:

receiving the consolidated 3D path; and performing the 3D path plausibility check on the consolidated 3D path by determining whether the consolidated 3D path satisfies one or more 3D path plausibility parameters, wherein the determining whether the consolidated 3D path satisfies the one or more 3D path plausibility parameters includes determining whether the consolidated 3D path meets at least one of: is smooth, without kinks of breaks, has a correct track gauge, has an acceptable Radius of Curvature (ROC), has an acceptable grade within predetermined grade bounds, has acceptable hill and sag within predetermined hill and sag bounds, has acceptable track transition curve, or has acceptable superelevation/crosslevel within predetermined superelevation/crosslevel bounds.

18. The non-transitory computer-readable media of claim 15, wherein the performing, in the path extraction pipeline, the at least one supervision check for providing the integrity to the consolidated 3D path includes, after the fusing the at least one passive 3D path and the at least one active 3D sensor path to produce the consolidated 3D path, performing a 3D path historical diversity check in the path extraction pipeline, the 3D path historical diversity check including:

receiving a past traversed path from a past window of size k;

receiving a past inertial measurements in the past window of size k;

based on the past traversed path from the past window of size k and the past inertial measurements in the past window of size k, determining a trustworthiness of the past traversed path; and based on the trustworthiness, determining whether the past traversed path matches the consolidated 3D path.

19. The non-transitory computer-readable media of claim 15, wherein the performing, in the path extraction pipeline, the at least one supervision check for providing the integrity to the consolidated 3D path includes, after the fusing the at least one passive 3D path and the at least one active 3D sensor path to produce the consolidated 3D path, performing a 3D path consistency check in the path extraction pipeline, the 3D path consistency check includes:

receiving the consolidated 3D path;

receiving a past traversed path; and verifying the consolidated 3D path includes no continuity breaks.

20. The non-transitory computer-readable media of claim 15, wherein the performing, in the path extraction pipeline, the at least one supervision check for providing the integrity to the consolidated 3D path includes, after the fusing the at least one passive 3D path and the at least one active 3D sensor path to produce the consolidated 3D path, performing at least one active 3D path similar sensors consistency check for the at least one active 3D sensor path to assess a similarity and that the at least one active 3D sensor path is within a predetermined active 3D sensor path tolerance, and at least one passive 3D path similar sensors consistency check for the at least one passive 3D path and to check that the at least one passive 3D path is within a predetermined passive 3D path tolerance.

*  *  *  *  *